(12) United States Patent
Crowley

(10) Patent No.: US 12,724,851 B1
(45) Date of Patent: Sep. 1, 2026

(54) SYSTEMS AND METHODS FOR DIGITAL IDENTITY GOVERNANCE, AUTHORIZED AI REPRESENTATION, AND AUTONOMOUS AGENT EXECUTION

(71) Applicant: Jacob Crowley, E Largo, FL (US)

(72) Inventor: Jacob Crowley, E Largo, FL (US)

(73) Assignee: MyAKH Inc., Clearwater, FL (US)

( * ) Notice: Subject to any disclaimer, the term of this patent is extended or adjusted under 35 U.S.C. 154(b) by 0 days.

(21) Appl. No.: 19/567,956

(22) Filed: Mar. 16, 2026

Related U.S. Application Data

(63) Continuation-in-part of application No. 19/333,759, filed on Sep. 19, 2025.

(51) Int. Cl.
*G06F 21/00* (2013.01)
*G06F 21/10* (2013.01)

(52) U.S. Cl.
CPC .................................. *G06F 21/101* (2023.08)

(58) Field of Classification Search
CPC .................................................... G06F 21/101
USPC ............................................................ 726/26
See application file for complete search history.

(56) References Cited

U.S. PATENT DOCUMENTS 12,367,638 B1 7/2025 Dehkordi
12,489,633 B1 12/2025 Arkoff
2007/0150612 A1 6/2007 Chaney
2015/0213195 A1 7/2015 Blechman
2022/0255931 A1 8/2022 Avetisov
2022/0300618 A1 9/2022 Ding
2024/0169635 A1 5/2024 Singh
2024/0331445 A1 10/2024 Sekar
2025/0209326 A1 6/2025 Madisetti
2025/0217700 A1 7/2025 Hsieh
(Continued)

FOREIGN PATENT DOCUMENTS

WO WO-2013013281 A1 1/2013

OTHER PUBLICATIONS

Uchi Uchibeke, title "Before the Tool Call: Deterministic Pre-Action Authorization for Autonomous AI Agents", APort Technologies Inc. Toronto, Canada uchi@aport.io, (Mar. 2026) (Year: 2026).*

*Primary Examiner* — Josnel Jeudy

(57) ABSTRACT

A computer-implemented deterministic identity governance system configured to enforce authorization-before-execution control over AI-based representation and agentic execution. An Identity Resolution Service (IRS) resolves identity inputs into a canonical subject identifier and wallet_id under fail-closed constraints. A deterministic embedding contract enforces version-locked model configurations, returning a VERSION_MISMATCH state upon incompatibility. A consent evaluation engine retrieves governance rules at a specific blockchain block-height snapshot. Upon authorization, the system generates a Decision Proof Object (DPO) that cryptographically binds the identity context, pipeline manifest hash, and consent state reference. The DPO functions as an execution authorization artifact required by a runtime execution environment prior to invocation of synthesis modules or agentic execution interfaces. In some embodiments, hashes of the DPO are Merkle-root anchored to a distributed ledger, enabling isolated, mathematically reproducible audit replay of the decision state.

30 Claims, 6 Drawing Sheets

(56) References Cited

U.S. PATENT DOCUMENTS

2025/0285551 A1 9/2025 Guedes
2025/0307955 A1 10/2025 Manivelan
2025/0321708 A1 10/2025 Treat
2025/0352907 A1 11/2025 Crabtree
2026/0010525 A1* 1/2026 Clark .................. G06F 16/2272
2026/0024631 A1* 1/2026 Kariguddaiah ........ G06N 3/098
2026/0056891 A1* 2/2026 Bhoja ....................... G06F 1/10
2026/0079453 A1* 3/2026 Singh ................... G05B 13/021
2026/0111292 A1* 4/2026 Ast ......................... G06F 9/542
2026/0113186 A1* 4/2026 Ast ...................... G06Q 30/018

* cited by examiner

SYSTEMS AND METHODS FOR DIGITAL IDENTITY GOVERNANCE, AUTHORIZED AI REPRESENTATION, AND AUTONOMOUS AGENT EXECUTION

CROSS-REFERENCE TO RELATED APPLICATION

The present application claims priority to U.S. Non-Provisional application Ser. No. 19/333,759, filed Sep. 19, 2025, titled "Systems and Methods for Creating Interactive AI Human Avatars From Multimodal Data for Legacy Preservation, Training, and Entertainment," which are hereby incorporated by reference in its entirety.

TECHNICAL FIELD

The present invention relates to computer-implemented digital identity governance, and more specifically to deterministic, replay-verifiable architectures for enforcing identity-bound consent constraints prior to AI-based representation synthesis or autonomous agentic execution.

BACKGROUND

Artificial intelligence systems are increasingly capable of generating highly realistic representations of individuals and executing autonomous agentic tasks on their behalf. However, existing generative pipelines lack deterministic, cryptographically verifiable governance mechanisms to ensure such executions are explicitly authorized. Conventional access-control systems operate at the infrastructure level and fail to tightly bind identity resolution, biometric validation, and block-height consent evaluation into a unified, fail-closed gating architecture. Furthermore, existing systems cannot deterministically reconstruct historical AI authorization decisions under identical model and policy conditions, nor provide reproducible audit replay mechanisms capable of restoring prior authorization states under frozen pipeline configurations. These deficiencies create security, auditability, and system integrity risks that cannot be addressed through generic licensing mechanisms or post-hoc moderation.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended to determine the scope of the claimed subject matter.

In one aspect, the disclosed embodiments include a deterministic identity governance system configured to prevent invocation of AI-based representation or agentic execution unless a cryptographically bound Decision Proof Object (DPO) is generated under a version-locked embedding contract and a blockchain block-height snapshot of consent state. The system includes a fail-closed Identity Resolution Service (IRS), deterministic embedding enforcement with VERSION_MISMATCH gating, and an isolated audit replay mode for reproducible reconstruction of historical authorization decisions. The system receives multimodal reference samples, generates a digital identity representation, and binds that representation to a set of governance rules through an identity-bound governance assertion. The system evaluates external requests to use the digital identity representation against the governance rules and issues a response comprising an approval, a denial, or a flag. This approach addresses the shortcoming of conventional systems that lack any mechanism for an individual to define, enforce, and update the conditions under which third parties may use their digital identity.

In one aspect, an Identity Issuance Module is a software module configured to generate a digital identity representation by processing multimodal reference samples associated with a human individual into a set of feature representations. The Identity Issuance Module also issues an identity-bound governance assertion binding the digital identity representation to a set of governance rules specifying authorized, restricted, and conditional uses of the digital identity representation.

In one aspect, a Digital Likeness Reference Module is a software module configured to store and manage the feature representations derived from multimodal reference samples. The Digital Likeness Reference Module makes the stored feature representations available to other modules for comparison, validation, and governance rule evaluation, and updates the stored feature representations upon receipt of new multimodal reference samples.

In one aspect, a Similarity and Validation Module is a software module configured to compare external content or external requests against the stored feature representations to determine a similarity score between the external content and the digital identity representation. The Similarity and Validation Module determines whether the similarity score satisfies a threshold and returns a validation result to the Enforcement Interface for further processing.

In one aspect, a Consent and Governance Engine is a software module configured to store and apply user-defined governance rules specifying authorized uses, restricted uses, and conditional uses of digital identity representation. The Consent and Governance Engine evaluates external requests and external content against the governance rules and determines whether a requested use is permitted, denied, or subject to conditional approval. The Consent and Governance Engine also applies behavioral authenticity rules in posthumous governance embodiments to restrict outputs to behaviors consistent with the digital identity representation of the individual.

In one aspect, an Enforcement Interface is a software module configured to receive external requests to use the digital identity representation, authenticate the external requests, route the requests through the Consent and Governance Engine, and issue standardized responses comprising approval, a denial, or a flag. In impersonation prevention embodiments, the Enforcement Interface executes enforcement actions comprising blocking, tagging, or alerting, and transmits those enforcement actions across a plurality of platforms through a cross-platform enforcement interface.

Identity Resolution Service (IRS) and Fail-Closed Canonicalization. In some embodiments, prior to evaluating any external request or external content, the system invokes an Identity Resolution Service (IRS) configured as the authoritative internal service for resolving identity context before governance logic is applied. The IRS accepts one or more identity inputs selected from: (i) a decentralized identifier (DID); (ii) an external identity identifier; and/or (iii) a credential reference issued by an identity proofing provider. The IRS returns canonical identity context comprising at least a canonical subject DID and a stable wallet identifier (wallet_id), and in some embodiments also returns a consent contract reference and a credential assurance level (CAL). The IRS operates under a fail-closed constraint: if multiple candidate mappings exist for a given set of identity inputs, the IRS returns an ambiguity error (e.g., AMBIGUOUS_IDENTITY) and downstream evaluation is terminated without authorizing execution. The Enforcement Interface does not perform identity resolution internally and instead invokes the Identity Resolution Service to obtain canonical identity context.

In one aspect, a Governance Dashboard is a software module configured to provide a control panel through which an individual or an authorized administrator may update governance rules, review tamper-evident logs of requests and responses, manage delegation and revocation of the identity-bound governance assertion, and administer posthumous governance rules and identity inheritance structures. The Governance Dashboard improves conventional systems by giving rights holders direct, auditable control over how their digital identity is accessed and deployed.

In some aspects, the system includes at least one computing device in operable communication with a network and an application server in operable communication with the network to host an application program for governing the use, enforcement, and posthumous continuation of a digital identity of a human individual across a plurality of platforms.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
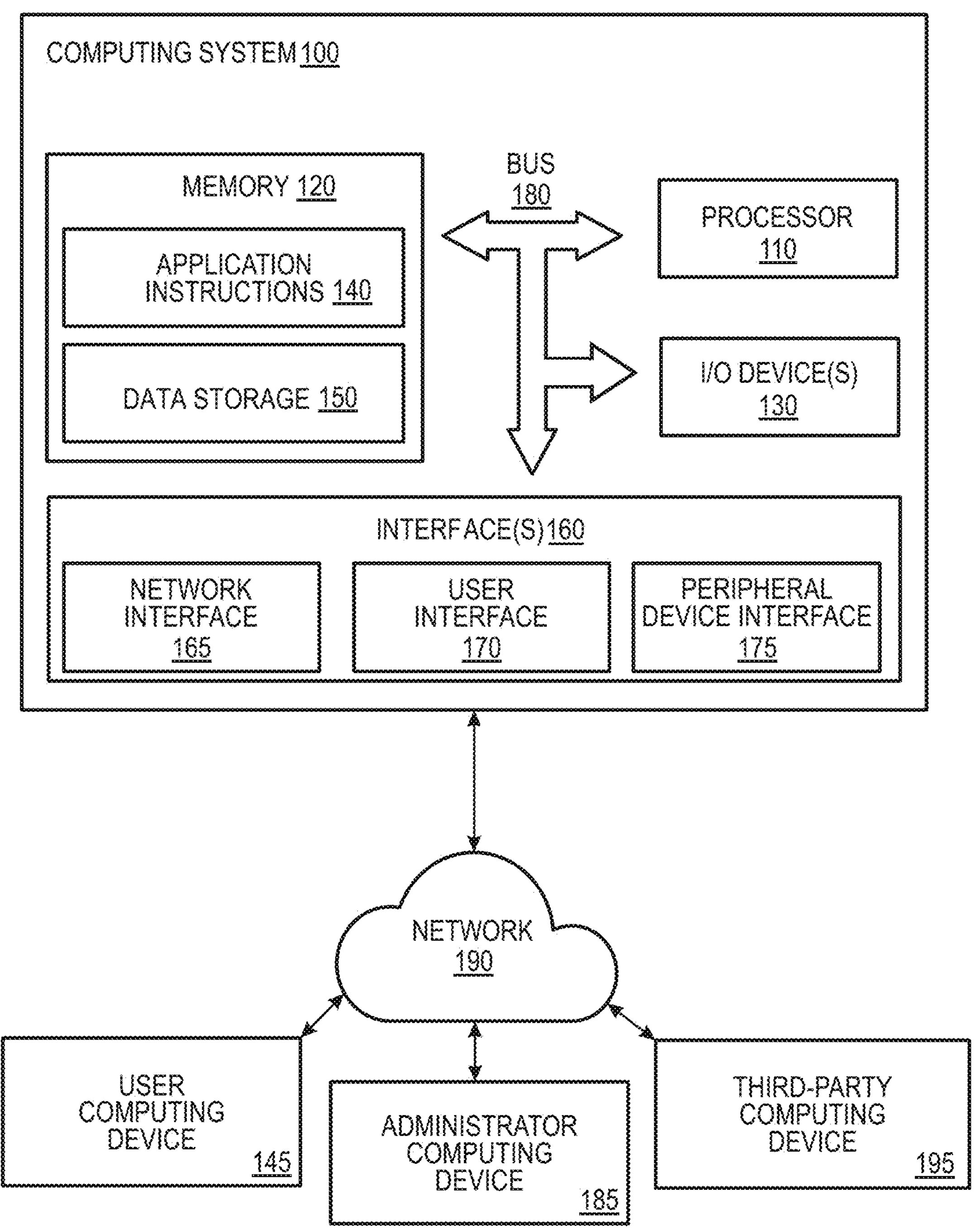
FIG. 1 illustrates a block diagram of the computing system infrastructure, including processor, memory, storage, and network interfaces, according to some embodiments.

The specific details of the single embodiment or variety of embodiments described herein are set forth in this application. Any specific details of the embodiments described herein are used for demonstration purposes only, and no unnecessary limitation(s) or inference(s) are to be understood or imputed therefrom. As used herein, the term "identity-bound governance assertion" refers to a cryptographically verifiable artifact binding a digital identity representation to a declared set of governance rules and execution constraints.

Before describing in detail exemplary embodiments, it is noted that the embodiments reside primarily in combinations of components related to devices and systems. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed system may include a computer-implemented identity governance platform comprising an Identity Issuance Module, a Digital Likeness Reference Module, a Similarity and Validation Module, a Consent and Governance Engine, an Enforcement Interface, and a Governance Dashboard. The system may operate on one or more processors executing instructions stored on a non-transitory computer-readable medium and may be deployed in a cloud-based or local computing environment accessible via a network. The modules communicate through internal APIs and shared data structures to receive multimodal reference samples, generate a digital identity representation, bind that representation to user-defined governance rules, evaluate external requests against those rules, and issue standardized responses. The system may further maintain tamper-evident logs of all requests and responses, support delegation, and revocation of the identity-bound governance assertion, and enforce posthumous governance rules through an identity inheritance structure.

In a preferred embodiment, the system executes a deterministic authorization-before-execution architecture. An Identity Resolution Service (IRS) resolves disparate external requests into a canonical wallet_id under a fail-closed ambiguity constraint. Prior to execution, a deterministic embedding contract verifies that a declared model identifier, preprocessing configuration identifier, and configuration hash match a recorded pipeline manifest hash. If an incompatibility is detected, the system prevents further execution and returns a VERSION_MISMATCH state. Upon positive validation, the system retrieves governance rules anchored to a specific blockchain block-height snapshot and generates a cryptographically bound Decision Proof Object (DPO). In some embodiments, the DPO includes a cryptographic signature over at least the identity context, the pipeline manifest hash, the consent state reference, and the decision outcome, enabling independent validation prior to execution. In some embodiments, the Decision Proof Object is serialized using a deterministic canonicalization procedure prior to hashing or signing to ensure that independent verification systems derive identical cryptographic hashes from identical decision contexts. The Decision Proof Object functions as an execution authorization artifact required by the enforcement interface to permit invocation of synthesis modules or agentic execution interface. The DPO binds the identity context, the pipeline manifest hash, the consent state reference, and the decision outcome, and is Merkle-root anchored to a distributed ledger to enable mathematically reproducible audit replay in an isolated environment.

In certain embodiments, the system includes a runtime enforcement environment configured to refuse execution of any inference or decision module unless a valid Decision Proof Object (DPO) is present and verified. The runtime environment validates the DPO signature and associated pipeline manifest prior to loading the model or executing any inference operation. If the DPO validation fails or is absent, the runtime environment prevents module initialization, thereby enforcing authorization-before-execution at the execution environment level.

Technical Improvement of AI Execution Infrastructure. The systems described herein do not merely perform authorization or policy evaluation for access to a computing resource. In some embodiments, invocation of synthesis modules or an agentic execution interface is programmatically prevented within the runtime environment unless the Decision Proof Object (DPO) signature validates. Instead, the disclosed execution-gating architecture modifies the operational behavior of machine learning pipelines themselves. By enforcing deterministic embedding contracts, verifying runtime configuration hashes, and generating cryptographically bound Decision Proof Objects (DPOs) prior to invocation of synthesis modules or an agentic execution interface, the system introduces a technical constraint on the execution of AI models. This architecture ensures that generative or agentic operations cannot proceed unless the identity resolution process, consent state evaluation, and execution environment validation collectively produce a verifiable authorization artifact. As a result, the system improves the reliability, traceability, and integrity of AI execution environments rather than merely implementing abstract authorization rules. Unlike conventional authorization or policy enforcement systems that merely evaluate rules prior to granting access to a computing resource, the disclosed architecture modifies the operational behavior of the runtime execution environment itself by preventing initialization or loading of machine learning inference modules unless a cryptographically verifiable Decision Proof Object has been generated and validated, thereby imposing a deterministic execution constraint on the underlying computing system.

In certain embodiments, generation and validation of the Decision Proof Object forms part of a unified execution control loop linking identity resolution, deterministic embedding compatibility verification, governance rule evaluation, and runtime execution enforcement. The runtime execution environment therefore permits invocation of synthesis modules or agentic execution interfaces only after canonical identity context has been resolved by the Identity Resolution Service, deterministic embedding compatibility has been verified, governance rules have been evaluated against a block-height consent snapshot, and a valid Decision Proof Object has been generated and cryptographically validated.

In some embodiments, the governance enforcement engine functions as the runtime execution constraint described above, preventing invocation of synthesis modules or agentic execution interfaces unless the Decision Proof Object (DPO) validates successfully.

In certain embodiments, the Decision Proof Object is structured to allow verification by external systems prior to downstream execution. A third-party system may validate the DPO signature, manifest hash, and identity context before permitting subsequent operations. This enables the system to operate as an identity governance clearinghouse across heterogeneous platforms, allowing external systems to rely on the Decision Proof Object as an authorization artifact prior to executing downstream actions while preserving authorization integrity.

Accordingly, the disclosed identity verification, likeness misuse detection, agentic task authorization, and posthumous governance enforcement mechanisms operate as coordinated execution conditions within the same deterministic governance enforcement architecture and shared execution pipeline, and therefore represent variations of a unified inventive concept rather than separate and independent inventions.

Deterministic Enforcement and Replay-Verifiable Governance Architecture. In some embodiments, the system is configured such that every likeness validation and governance decision is deterministic, traceable, and replay-verifiable. Determinism means that identical inputs processed under an identical declared pipeline configuration produce identical feature representations and identical decision outcomes. To achieve this, the system implements:

- (i) deterministic embedding generation with explicit versioning and configuration hashing;
- (ii) deterministic similarity scoring using versioned threshold parameters;
- (iii) an Identity Resolution Service (IRS) providing canonical identity context under fail-closed constraints;
- (iv) Decision Proof Object (DPO) generation cryptographically binding decision context;
- (v) consent state evaluation anchored to a specific blockchain block-height snapshot; and
- (vi) an audit replay mode isolated from production traffic for verification of historical decisions.

These mechanisms convert AI likeness governance behavior from a probabilistic evaluation process into a reproducible and forensically defensible technical protocol. The pipeline manifest hash structurally constrains model invocation to a declared configuration state, preventing execution under unverified model weights or preprocessing configurations, thereby improving computer reliability and reproducibility.

In certain embodiments, the Identity Resolution Service operates as the exclusive authority for generating canonical identity context within the system. All downstream authorization, similarity evaluation, governance evaluation, and enforcement modules are configured to rely exclusively on identity context generated by the Identity Resolution Service, thereby preventing alternative identity-resolution pathways from bypassing the fail-closed resolution mechanism.

In some embodiments, the pipeline manifest hash is generated by hashing at least: (i) a model identifier and optional model-parameter digest; (ii) a digest of preprocessing code or container configuration; (iii) declared numeric precision parameters; and (iv) a declared similarity algorithm version identifier. The manifest hash is stored as part of the Decision Proof Object and is used during audit replay to reconstruct the identical computational state under which the authorization decision was rendered.

In various embodiments, the deterministic enforcement architecture described herein provides a unified technical substrate underlying governance assertion issuance, unauthorized representation detection, and posthumous governance enforcement. Each of these embodiments relies on the same fail-closed identity resolution, deterministic embedding contract, and cryptographically bound decision validation pipeline to condition execution of AI-based representation or agentic action. Accordingly, the disclosed systems represent variations of a common execution-gating architecture rather than independent inventions.

In certain embodiments, the system supports deterministic replay of prior decisions by reconstructing the identical inference pipeline using the pipeline manifest hash recorded in the Decision Proof Object. The manifest hash references the specific model weights, preprocessing configuration, and execution parameters used during the original decision, allowing an independent auditor to reproduce the decision outcome under identical computational conditions.

Conventional systems lack any unified mechanism by which a human individual may define, enforce, and update the conditions under which their digital identity, likeness, voice, or behavioral representation may be accessed or used by third parties, including AI-generated systems. This absence of identity governance infrastructure has enabled unauthorized replication of digital likenesses, posthumous deepfakes, and uncontrolled commercial exploitation of personal identity attributes without the consent of the individual or their estate. The disclosed system addresses these shortcomings by generating an identity-bound governance assertion that binds a digital identity representation to a set of user-defined governance rules, and by providing an Enforcement Interface that evaluates every external request against those rules before issuing a response. In this way, the system introduces a practical, enforceable governance layer between a person's digital identity and any third party seeking to use it.

Governed Autonomous Digital Representation. In some embodiments, the digital identity representation governs not only representational outputs but also agentic execution actions. Agentic actions may include external API calls, transactional operations, account interactions, or automated system tasks performed by an identity-bound AI representation. Such agentic actions are conditioned on the same identity resolution, consent evaluation, and deterministic manifest validation pipeline described herein. Authorization determinations are recorded as DPOs to provide non-repudiable proof of permitted or denied agentic execution.

In practice and in use, the system may be utilized in cases where a public figure, private individual, or estate administrator seeks to control how an AI-generated representation of a person's voice, appearance, or behavioral characteristics is accessed and deployed across digital platforms. For example, a user may provide multimodal reference samples comprising video recordings, audio samples, and written content to the Identity Issuance Module, which processes the samples into a digital identity representation and issues an identity-bound governance assertion specifying that commercial use of the representation requires explicit approval, while family use is conditionally permitted. In response to an external request from a third-party platform seeking to deploy an AI-generated avatar of the individual, the Enforcement Interface routes the request through the Consent and Governance Engine, which evaluates the request against the stored governance rules and issues a denial or approval accordingly. The Governance Dashboard may then notify the individual or authorized administrator of the request and the response issued and may allow the governance rules to be updated in response to the event.

In this way, the system may provide a technically enforceable and auditable framework for identity governance that conventional systems do not offer, reducing the computational overhead associated with manual rights enforcement by automating evaluation and response generation at the Enforcement Interface level. The system may further reduce network-level exposure by evaluating governance rules locally or within a secured application server prior to transmitting any identity-related data to external platforms, thereby improving the security profile of the computing environment on which it operates. By centralizing governance rule management in the Consent and Governance Engine and providing real-time logging through the tamper-evident log, the system enables rights holders to maintain continuous, auditable oversight of how their digital identity is used, which represents a material improvement over conventional systems that offer no equivalent capability.

Audit Replay Mode. In some embodiments, the system includes a read-only audit replay mode isolated from production traffic. The replay mode loads historical identity context, consent block-height snapshot, and pipeline manifest hash, and re-executes the deterministic embedding and similarity pipeline to verify that the reproduced outcome matches the recorded DPO. Replay operations are access-controlled and logged.

Various implementations of the present embodiments involve computer-implemented identity governance and deterministic enforcement architectures that are inherently rooted in computer technology. The disclosed system processes multimodal reference samples into structured feature representations, generates an identity-bound governance assertion, evaluates external requests against machine-readable governance rules, and conditions execution of AI-based representation or agentic action on a cryptographically bound Decision Proof Object. These operations require coordinated processor execution, version-locked embedding generation, blockchain block-height state retrieval, and manifest-hash validation that cannot be performed mentally or through manual methods.

The disclosed execution-gating architecture provides a technical improvement to computer systems by enforcing deterministic model-state validation, fail-closed identity resolution, and reproducible authorization replay. These mechanisms structurally constrain AI execution and prevent invocation under incompatible model configurations or invalid governance states, thereby improving system reliability, auditability, and computational integrity beyond conventional access-control frameworks. Unlike conventional authorization frameworks that merely evaluate policy rules before issuing an access decision, the disclosed architecture modifies the operational behavior of the runtime execution environment itself by preventing initialization or loading of machine learning inference modules unless a cryptographically verifiable Decision Proof Object is present and validated. As a result, the system imposes a deterministic execution constraint on the underlying computing environment, thereby improving the technical functioning, reliability, and security of AI execution infrastructure.

FIG. 1 illustrates an example of a computer system 100 that may be utilized to execute various procedures, including the processes described herein. The computer system 100 comprises a standalone computer or mobile computing device, a mainframe computer system, a workstation, a network computer, a desktop computer, a laptop, or the like. The computing device 100 can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive).

In some embodiments, the computer system 100 includes one or more processors 110 coupled to a memory 120 through a system bus 180 that couples various system components, such as an input/output (I/O) devices 130, to the processors 110. The bus 180 may be any of several types of bus structures including a memory bus or memory controller, a peripheral bus, and a local bus using any of a variety of bus architectures. For example, such architecture includes Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

In some embodiments, the computer system 100 includes one or more input/output (I/O) devices 130, such as video device(s) (e.g., a camera), audio device(s), and display(s) are in operable communication with the computer system 100. In some embodiments, similar I/O devices 130 may be separate from the computer system 100 and may interact with one or more nodes of the computer system 100 through a wired or wireless connection, such as over a network interface.

Processors 110 suitable for the execution of computer readable program instructions include both general and special purpose microprocessors and any one or more processors of any digital computing device. For example, each processor 110 may be a single processing unit or a number of processing units and may include single or multiple computing units or multiple processing cores. The processor(s) 110 can be implemented as one or more microprocessors, microcomputers, microcontrollers, digital signal processors, central processing units, state machines, logic circuitries, and/or any devices that manipulate signals based on operational instructions. For example, the processor(s) 110 may be one or more hardware processors and/or logic circuits of any suitable type specifically programmed or configured to execute the algorithms and processes described herein. The processor(s) 110 can be configured to fetch and execute computer readable program instructions stored in the computer-readable media, which can program the processor(s) 110 to perform the functions described herein.

In this disclosure, the term "processor" can refer to substantially any computing processing unit or device, including single-core processors, single-processors with software multithreading execution capability, multi-core processors, multi-core processors with software multithreading execution capability, multi-core processors with hardware multithread technology, parallel platforms, and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures, such as molecular and quantum-dot based transistors, switches, and gates, to optimize space usage or enhance performance of user equipment. A processor can also be implemented as a combination of computing processing units.

In some embodiments, the memory 120 includes computer-readable application instructions 140, configured to implement certain embodiments described herein, and a database 150, comprising various data accessible by the application instructions 140. In some embodiments, the application instructions 140 include software elements corresponding to one or more of the various embodiments described herein. For example, application instructions 140 may be implemented in various embodiments using any desired programming language, scripting language, or combination of programming and/or scripting languages (e.g., Android, C, C++, C#, JAVA, JAVASCRIPT, PERL, etc.).

In this disclosure, terms "store," "storage," "data store," data storage," "database," and substantially any other information storage component relevant to operation and functionality of a component are utilized to refer to "memory components," which are entities embodied in a "memory," or components comprising a memory. Those skilled in the art would appreciate that the memory and/or memory components described herein can be volatile memory, nonvolatile memory, or both volatile and nonvolatile memory. Nonvolatile memory can include, for example, read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include, for example, RAM, which can function as external cache memory. The memory and/or memory components of the systems or computer-implemented methods can include the foregoing or other suitable types of memory.

A computing device will also include or be operatively coupled to receive data from or transfer data to, or both, one or more mass data storage devices; however, a computing device need not have such devices. Hosting platforms may be implemented including public or private clouds. Further, various cloud storage systems including table storage, blob storage databases, etc. may be used. The computer readable storage medium (or media) can be a tangible device that can retain and store instructions for use by an instruction execution device. The computer readable storage medium can be, for example, an electronic storage device, a magnetic storage device, an optical storage device, an electromagnetic storage device, a semiconductor storage device, or any suitable combination of the foregoing. A non-exhaustive list of more specific examples of the computer readable storage medium can include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In this disclosure, a computer readable storage medium is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In some embodiments, the steps, and actions of the application instructions 140 described herein are embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

In some embodiments, the application instructions 140 for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The application instructions 140 can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

In some embodiments, the application instructions 140 can be downloaded to a computing/processing device from a computer readable storage medium, or to an external computer or external storage device via a network 190. A network adapter card or network interface in each computing/processing device receives computer readable program instructions from the network and forwards the computer readable application instructions 140 for storage in a computer readable storage medium within the respective computing/processing device.

In some embodiments, the computer system 100 includes one or more interfaces 160 that allow the computer system 100 to interact with other systems, devices, or computing environments. In some embodiments, the computer system 100 comprises a network interface 165 to communicate with a network 190. In some embodiments, the network interface 165 is configured to allow data to be exchanged between the computer system 100 and other devices attached to the network 190, such as other computer systems, or between nodes of the computer system 100. In various embodiments, the network interface 165 may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol. Other interfaces include the user interface 170 and the peripheral device interface 175.

In some embodiments, the network 190 corresponds to a local area network (LAN), wide area network (WAN), the Internet, a direct peer-to-peer network (e.g., device to device Wi-Fi, Bluetooth, etc.), and/or an indirect peer-to-peer network (e.g., devices communicating through a server, router, or other network device). The network 190 can comprise copper transmission cables, optical transmission fibers, wireless transmission, routers, firewalls, switches, gateway computers, and/or edge servers. The network 190 can represent a single network or multiple networks. In some embodiments, the network 190 used by the various devices of the computer system 100 is selected based on the proximity of the devices to one another or some other factor. For example, when a first user device and second user device are near each other (e.g., within a threshold distance, within direct communication range, etc.), the first user device may exchange data using a direct peer-to-peer network. But when the first user device and the second user device are not near each other, the first user device and the second user device may exchange data using a peer-to-peer network (e.g., the Internet). The Internet refers to the specific collection of networks and routers communicating using an Internet Protocol ("IP") including higher level protocols, such as Transmission Control Protocol/Internet Protocol ("TCP/IP") or the Uniform Datagram Packet/Internet Protocol ("UDP/IP").

Any connection between the components of the system may be associated with a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. As used herein, the terms "disk" and "disc" include compact disc (CD), laser disc, optical disc, digital versatile disc (DVD), floppy disk, and Blu-ray disc; in which "disks" usually reproduce data magnetically, and "discs" usually reproduce data optically with lasers. Combinations of the above should also be included within the scope of computer-readable media. In some embodiments, the computer-readable media includes volatile and nonvolatile memory and/or removable and non-removable media implemented in any type of technology for storage of information, such as computer-readable instructions, data structures, program modules, or other data. Such computer-readable media may include RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the computing device, the computer-readable media may be a type of computer-readable storage media and/or a tangible non-transitory media to the extent that when mentioned, non-transitory computer-readable media exclude media such as energy, carrier signals, electromagnetic waves, and signals per se.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

In some embodiments, the system can also be implemented in cloud computing environments. In this context, "cloud computing" refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

As used herein, the term "add-on" (or "plug-in") refers to computing instructions configured to extend the functionality of a computer program, where the add-on is developed specifically for the computer program. The term "add-on data" refers to data included with, generated by, or organized by an add-on. Computer programs can include computing instructions, or an application programming interface (API) configured for communication between the computer program and an add-on. For example, a computer program can be configured to look in a specific directory for add-ons developed for the specific computer program. To add an add-on to a computer program, for example, a user can download the add-on from a website and install the add-on in an appropriate directory on the user's computer.

In some embodiments, the computer system 100 may include a user computing device 145, an administrator computing device 185 and a third-party computing device 195 each in communication via the network 190. The administrator computing device 185 is utilized by an administrative user to moderate content and to perform other administrative functions. The third-party computing device 195 may be utilized by third parties to receive communications from the user computing device, transmit communications to the user via the network, and otherwise interact with the various functionalities of the system.

Figure 2:
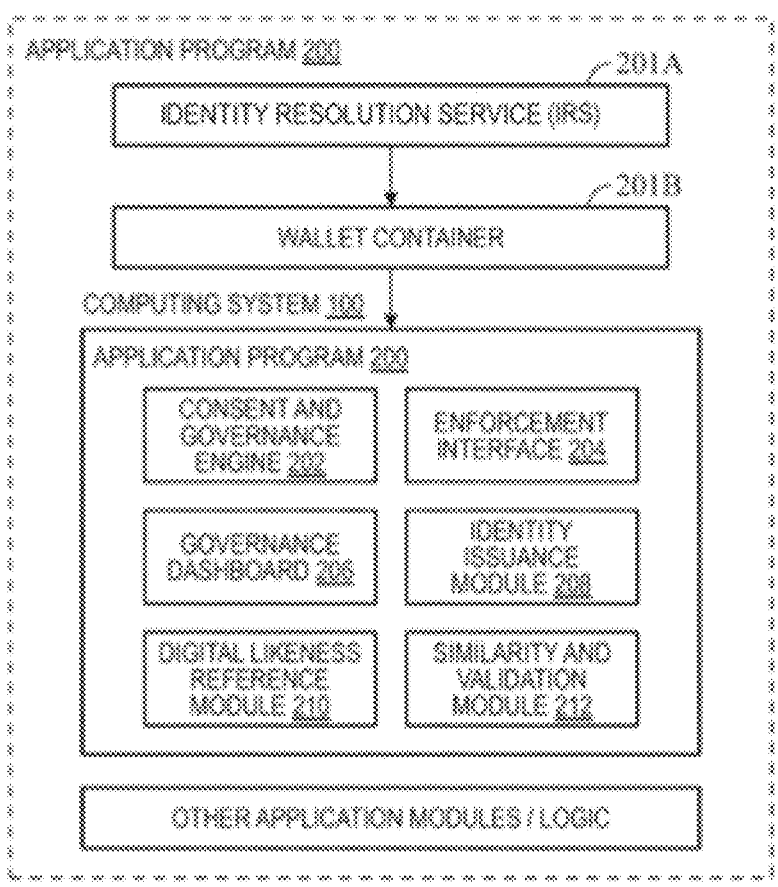
FIG. 2 illustrates an application program architecture comprising an Identity Resolution Service (IRS), a wallet identifier abstraction (wallet_id), an Identity Issuance Module, a Digital Likeness Reference Module, a Similarity and Validation Module, a Consent and Governance Engine, an Enforcement Interface, and a Governance Dashboard, according to some embodiments.

FIG. 2 illustrates an example of an application program 200 hosted on the computing system 100 of FIG. 1. The application program 200 comprises an Identity Resolution Service (IRS) 201A, a wallet identifier abstraction (wallet_id) 201B, a Consent and Governance Engine 202, an Enforcement Interface 204, a Governance Dashboard 206, an Identity Issuance Module 208, a Digital Likeness Reference Module 210, and a Similarity and Validation Module 212. As illustrated, data flow may be routed through the Identity Resolution Service (IRS) 201A and wallet_id 201B prior to downstream governance evaluation. Each of these components may be implemented as a software module executing on one or more processors 110 of FIG. 1, with instructions stored in the memory 120 of FIG. 1. The modules of the application program 200 communicate with one another through internal application programming interfaces and shared data structures stored in the data storage 150 of FIG. 1. The application program 200 may be deployed as a cloud-hosted service, a locally installed application, or a hybrid architecture in which certain modules execute on a remote server while others execute on a local computing device accessible via the network 190 of FIG. 1.

The Identity Issuance Module 208 is a software module configured to receive multimodal reference samples associated with a human individual and process those multimodal reference samples into a set of feature representations characterizing the individual. The multimodal reference samples may comprise one or more of visual data, audio data, behavioral data, and linguistic data. Visual data may include images or video recordings of the individual. Audio data may include voice recordings or speech samples. Behavioral data may include interaction patterns, psychometric assessment responses, or preference scoring data. Linguistic data may include written documents, electronic messages, or transcribed speech. The Identity Issuance Module 208 processes each category of multimodal reference sample through a corresponding feature extraction pipeline, applying one or more machine learning models to encode the received data into a structured set of feature representations. The resulting set of feature representations collectively constitutes the digital identity representation of the individual. The Identity Issuance Module 208 stores the digital identity representation in the data storage 150 of FIG. 1 and transmits the digital identity representation to the Digital Likeness Reference Module 210 for ongoing management.

In some non-limiting embodiments, the Identity Issuance Module 208 applies a transformer-based neural network model to process linguistic and behavioral data into high-dimensional vector embeddings that capture semantic, stylistic, and behavioral characteristics of the individual. Transformer-based models process input sequences through multi-head attention mechanisms and feed-forward neural network layers, enabling the Identity Issuance Module 208 to capture nuanced contextual relationships within the individual's linguistic and behavioral data that simpler models cannot represent.

In some non-limiting embodiments, the Identity Issuance Module 208 applies a convolutional neural network model to extract facial and visual feature representations from image and video data provided as multimodal reference samples. The convolutional neural network model may be pre-trained on large datasets of visual identity data and fine-tuned using the individual's specific visual data to produce feature representations with a high degree of specificity to the individual.

Following generation of the digital identity representation, the Identity Issuance Module 208 generates an identity-bound governance assertion by binding the digital identity representation to a set of governance rules supplied by the individual or an authorized administrator. The governance rules specify authorized uses, restricted uses, and conditional uses of the digital identity representation. Authorized uses may include uses expressly permitted by the individual without additional approval. Restricted uses may include uses that the individual has expressly prohibited. Conditional uses may include uses that require satisfaction of one or more conditions, such as approval by the individual, payment of a fee, or restriction to a specified platform or time, before the use is permitted. The Identity Issuance Module 208 stores the identity-bound governance assertion in the data storage 150 of FIG. 1 in association with the digital identity representation and transmits the governance rules to the Consent and Governance Engine 202 for enforcement.

Identity Resolution Service (IRS). In some embodiments, prior to any similarity evaluation or governance rule enforcement, the system invokes an Identity Resolution Service (IRS) configured as the authoritative identity context resolver. The IRS receives one or more of: (i) a decentralized identifier (DID), (ii) an external identity identifier, and/or (iii) a credential reference issued by an identity proofing provider. The IRS returns canonical identity context comprising at least a canonical subject_did and a stable wallet_id, and in some embodiments also returns a consent_contract_ref and credential assurance metadata.

The IRS operates under a fail-closed constraint. If multiple candidate mappings exist for a given identity input set, the IRS returns an ambiguity error state and downstream execution is terminated without authorizing synthesis, interaction, or agentic execution. In some embodiments, the Enforcement Interface does not perform identity resolution internally and is configured to invoke the IRS to obtain canonical identity context.

The Digital Likeness Reference Module 210 is a software module configured to store and manage the set of feature representations generated by the Identity Issuance Module 208. The Digital Likeness Reference Module 210 maintains the digital identity representation in a structured data store within the data storage 150 of FIG. 1 and makes the stored feature representations accessible to the Similarity and Validation Module 212 and the Consent and Governance Engine 202 through internal application programming interface calls. The Digital Likeness Reference Module 210 may organize the stored feature representations by data modality, associating each feature representation with metadata describing the source, timestamp, and modality of the corresponding multimodal reference sample from which the feature representation was derived. The Digital Likeness Reference Module 210 may update the stored feature representations in response to receipt of new multimodal reference samples by reprocessing the new samples through the feature extraction pipeline of the Identity Issuance Module 208 and merging the resulting feature representations into the existing digital identity representation stored in the data storage 150 of FIG. 1.

In some embodiments, the Digital Likeness Reference Module 210 generates and stores cryptographic hashes of the stored feature representations to enable verification of data integrity. The Digital Likeness Reference Module 210 may recompute a cryptographic hash of the feature representations at any point and compare the recomputed hash against the stored hash to detect unauthorized modification of the digital identity representation. Where a mismatch is detected, the Digital Likeness Reference Module 210 may transmit an alert to the Enforcement Interface 204 and record the integrity violation in the tamper-evident log maintained by the Enforcement Interface 204.

In some embodiments, the Digital Likeness Reference Module 210 supports versioning of the digital identity representation, maintaining a history of prior versions of the stored feature representations so that an individual or authorized administrator may review or restore a prior version through the Governance Dashboard 206. Each version may be stored with an associated timestamp and a record of the update instruction that triggered the version change.

The Similarity and Validation Module 212 is a software module configured to compare external content or data included in an external request against the stored feature representations maintained by the Digital Likeness Reference Module 210 to determine a similarity score between the external content and the digital identity representation. The Similarity and Validation Module 212 first extracts feature representations from the external content using the same feature extraction models applied by the Identity Issuance Module 208, ensuring that the comparison is performed in a consistent feature space. The Similarity and Validation Module 212 then applies a similarity scoring algorithm to quantify the similarity score between the feature representations extracted from the external content and the feature representations stored in the Digital Likeness Reference Module 210. The similarity scoring algorithm may compute cosine similarity over high-dimensional feature embeddings, producing a numerical similarity score between zero and one, where a score approaching one indicates a high similarity score. The Similarity and Validation Module 212 returns the similarity score to the Enforcement Interface 204, which uses the similarity score in evaluating whether the external content or external request involves the digital identity representation of the individual.

In some embodiments, the Similarity and Validation Module 212 may apply a threshold-based classification model that maps the computed similarity score to a classification output, such as authorized, unauthorized, or requiring further review, which the Enforcement Interface 204 may use directly in generating a response. The threshold value used by the classification model may be configurable by the individual or authorized administrator through the Governance Dashboard 206.

In some embodiments, the Similarity and Validation Module 212 may perform modality-specific comparisons, computing separate similarity scores for visual, audio, behavioral, and linguistic data modalities and aggregating those scores through a weighted combination to produce a composite similarity score. The weights applied to each modality may be configurable by the individual or authorized administrator through the Governance Dashboard 206, enabling the individual to assign greater weight to modalities that are most characteristic of the individual's identity.

Deterministic Embedding Contract and Version Governance. In some embodiments, embedding generation is governed by a deterministic embedding contract. Determinism may be achieved by disabling randomness or fixing random seeds, defining numeric precision settings, ordering and versioning preprocessing steps, and enforcing a declared model identifier and preprocessing configuration identifier under a configuration hash. Each embedding is associated with metadata comprising at least: an embedding identifier, subject_did, model identifier and version, preprocessing configuration identifier and version, configuration hash, timestamp, and embedding hash.

If embeddings originate from incompatible model identifiers, preprocessing configurations, or deterministic embedding contract identifiers, the system returns a VERSION_MISMATCH state. In VERSION_MISMATCH states, the similarity score may be null or treated as invalid, and consent evaluation does not proceed until embeddings are regenerated under a compatible deterministic embedding contract.

The Consent and Governance Engine 202 is a software module configured to store and apply the governance rules associated with the identity-bound governance assertion generated by the Identity Issuance Module 208. The Consent and Governance Engine 202 receives evaluation requests from the Enforcement Interface 204 comprising the attributes of an external request and, where applicable, a similarity score from the Similarity and Validation Module 212. The Consent and Governance Engine 202 evaluates the external request against the stored governance rules by executing a rule evaluation algorithm that compares the attributes of the external request, such as the identity of the requesting party, the intended use, the target platform, and the similarity score, against the conditions specified in the governance rules. The governance rules may be stored in a structured schema, such as a JSON-based rule set that specifies conditions and corresponding outcomes in a machine-readable format. The Consent and Governance Engine 202 parses the structured schema and evaluates each condition against the attributes of the external request in sequence, applying logical operators to combine conditions where the governance rules specify compound conditions. The Consent and Governance Engine 202 returns an evaluation result to the Enforcement Interface 204 specifying whether the external request is authorized, restricted, or subject to conditional approval. In some embodiments, the evaluation result is mapped to an approval, denial, or flag response issued by the Enforcement Interface.

The Consent and Governance Engine 202 may also store and apply posthumous governance rules in embodiments directed to governing a digital identity of an individual after the death of the individual, as described further below with reference to FIG. 5. In such embodiments, the Consent and Governance Engine 202 may store behavioral authenticity rules as part of the posthumous governance rules, restricting outputs derived from the digital identity representation to behaviors consistent with the digital identity representation of the individual as established from the multimodal reference samples collected prior to the death of the individual.

In some embodiments, the Consent and Governance Engine 202 may implement a blockchain-based smart contract layer for storing and enforcing governance rules. In such embodiments, the governance rules may be encoded as smart contract logic deployed on a distributed ledger, and the Consent and Governance Engine 202 may invoke the smart contract to evaluate external requests and record evaluation results in a tamper-evident manner on the distributed ledger. The blockchain-based smart contract layer may also support automated execution of conditional governance outcomes, such as triggering a payment or notifying the individual upon approval of a conditional use request.

Block-Height Snapshot Consent Enforcement. In blockchain embodiments, the system retrieves consent state at a specific block number and records an associated block hash to freeze policy state at evaluation time, where the recorded snapshot information is included as part of a consent state reference. In some embodiments, the consent state reference includes a consent policy hash (consent_policy_hash) representing the governance rule state captured at the block-height snapshot. The enforcement decision is valid only if the consent_policy_hash matches the consent policy state at the captured block-height snapshot, thereby preventing race conditions between revocation events and inference requests.

In certain embodiments, the block-height snapshot ensures that the consent state evaluated during enforcement corresponds to the exact governance state that existed at the time of decision generation, thereby preventing race conditions arising from subsequent consent updates.

Decision Proof Object (DPO) and Manifest Hash. In some embodiments, each enforcement decision results in generation of a signed Decision Proof Object (DPO) comprising a subject decentralized identifier (DID), a wallet identifier (wallet_id), a decision outcome, reason code, timestamp, consent state reference, and a deterministic pipeline manifest hash. The pipeline manifest hash cryptographically binds at least a model identifier (and, in some embodiments, an optional model-parameter digest), a preprocessing code or container digest, numeric precision settings, and a similarity algorithm version to the decision context. In some embodiments, the Decision Proof Object is serialized using a deterministic canonicalization procedure prior to hashing or signing such that independent systems processing an identical decision context derive an identical canonical representation and cryptographic hash.

Cryptographic validation of the DPO comprises verifying a digital signature over at least a subset of the DPO fields using a corresponding public key and verifying integrity of the pipeline manifest hash and consent state reference as recorded. In some embodiments, the digital signature covers at least identity context, the pipeline manifest hash, the consent state reference, and the decision outcome. In certain embodiments, the signed Decision Proof Object is transmitted to an external verification system or receiving platform, which validates the cryptographic signature and associated manifest information prior to permitting downstream execution of a requested operation.

Merkle Root Anchoring. For high-frequency execution environments, hashes of individual Decision Proof Objects may be batched into a Merkle tree, and only the Merkle root may be anchored to a distributed ledger. This preserves inclusion-proof capability for each underlying Decision Proof Object while reducing anchoring overhead and improving scalability.

In certain embodiments, generation and validation of the Decision Proof Object forms part of a unified execution control loop linking identity resolution, deterministic pipeline validation, governance rule evaluation, and runtime execution enforcement. The runtime execution environment therefore permits invocation of synthesis modules or agentic execution interfaces only after canonical identity context has been resolved by the Identity Resolution Service, deterministic embedding compatibility has been verified, governance rules have been evaluated against a block-height consent snapshot, and a valid Decision Proof Object has been generated and verified.

In some embodiments, the Consent and Governance Engine 202 may support delegation of a subset of the governance rules to a designated representative. The Consent and Governance Engine 202 may store a delegation record in the data storage 150 of FIG. 1 associating the designated representative with the subset of governance rules and the scope of actions the designated representative is authorized to perform on behalf of the individual. The Consent and Governance Engine 202 may apply the delegation record during evaluation of external requests originating from or submitted on behalf of the designated representative, permitting the designated representative to approve or deny external requests within the scope of the delegated governance rules without requiring action from the individual.

The Enforcement Interface 204 is a software module configured to receive external requests to use the digital identity representation, coordinate evaluation of those external requests through the Similarity and Validation Module 212 and the Consent and Governance Engine 202, and issue standardized responses to the requesting party. The Enforcement Interface 204 may receive external requests through a network-facing application programming interface endpoint accessible to third-party platforms and services via the network interface 165 of FIG. 1. Upon receipt of an external request, the Enforcement Interface 204 may, where applicable, validate whether the external request corresponds to the digital identity representation by extracting identity-related data from the request and submitting that data to the Similarity and Validation Module 212 for comparison against the stored feature representations maintained by the Digital Likeness Reference Module 210. The Enforcement Interface 204 then submits the external request and the similarity score returned by the Similarity and Validation Module 212 to the Consent and Governance Engine 202 for evaluation against the governance rules. Based on the evaluation result returned by the Consent and Governance Engine 202, the Enforcement Interface 204 issues a response to the requesting party comprising one of approval, a denial, or a flag. A flag response may indicate that the external request requires further review by the individual or an authorized administrator before a final determination is made, and the Enforcement Interface 204 may transmit a notification to the Governance Dashboard 206 upon issuing a flag response.

The Enforcement Interface 204 may also be configured to execute enforcement actions in response to a determination of unauthorized representation. Enforcement actions available to the Enforcement Interface 204 may include blocking the external content, tagging the external content with a marker identifying the external content as an unauthorized representation, and generating an alert for transmission to the individual or authorized administrator through the Governance Dashboard 206. The Enforcement Interface 204 may transmit enforcement actions to a plurality of external platforms through a cross-platform enforcement interface, enabling coordinated enforcement across multiple digital environments in response to a single enforcement determination. The cross-platform enforcement interface may communicate with external platforms through standardized application programming interface calls, transmitting enforcement instructions in a format compatible with each external platform's content moderation or access control systems.

The Enforcement Interface 204 may maintain a tamper-evident log of each external request received and each response issued. The tamper-evident log may be stored in the data storage 150 of FIG. 1 and may be implemented using append-only data structures or cryptographic chaining techniques, such as hash-linked log entries, that prevent modification of previously recorded entries. Each log entry may record the timestamp of the external request, the identity of the requesting party, the similarity score computed by the Similarity and Validation Module 212, the evaluation result returned by the Consent and Governance Engine 202, and the response issued by the Enforcement Interface 204. The tamper-evident log may be accessible to the individual or authorized administrator through the Governance Dashboard 206.

In some embodiments, the Enforcement Interface 204 may apply the enforcement action specifically to AI-generated content determined to replicate the digital identity representation without authorization. In such embodiments, the Similarity and Validation Module 212 may be configured to analyze AI-generated content, such as synthetic video, synthetic audio, or generated text, using the same feature extraction and similarity scoring pipeline applied to other external content, enabling the Enforcement Interface 204 to detect and respond to unauthorized AI-generated representations of the individual in the same manner as other unauthorized representations.

The Governance Dashboard 206 is a software module configured to provide a user interface through which the individual or an authorized administrator may manage the governance rules, review the tamper-evident log maintained by the Enforcement Interface 204, update the identity-bound governance assertion, and administer delegation, revocation, and posthumous governance settings. The Governance Dashboard 206 may be accessible through a web browser, a mobile application, or a dedicated desktop application communicating with the application program 200 via the network 190 of FIG. 1. The Governance Dashboard 206 may present the current governance rules stored in the Consent and Governance Engine 202 in a structured, human-readable format and may provide input controls through which the individual or authorized administrator may add, modify, or remove governance rules. In response to a governance rule update submitted through the Governance Dashboard 206, the Governance Dashboard 206 transmits an update instruction to the Consent and Governance Engine 202, which updates the stored governance rules accordingly and records the update in the tamper-evident log maintained by the Enforcement Interface 204.

The Governance Dashboard 206 may transmit revocation instructions to the Consent and Governance Engine 202 in response to a revocation action initiated by the individual or authorized administrator. Upon receipt of a revocation instruction, the Consent and Governance Engine 202 invalidates the identity-bound governance assertion and causes the Enforcement Interface 204 to deny all subsequent external requests until a new identity-bound governance assertion is issued by the Identity Issuance Module 208. The Governance Dashboard 206 may present the revocation status of the identity-bound governance assertion to the individual or authorized administrator and may provide controls for reinstating or replacing the identity-bound governance assertion.

In some embodiments, the Governance Dashboard 206 may provide a real-time notification interface that alerts the individual or authorized administrator upon receipt of an external request by the Enforcement Interface 204, the execution of an enforcement action, or the detection of a similarity score exceeding a configurable threshold by the Similarity and Validation Module 212. Notifications may be delivered through the user interface 170 of FIG. 1, by electronic mail, or through a push notification service accessible via the network 190 of FIG. 1.

In some embodiments, the Governance Dashboard 206 may support role-based access controls, enabling the individual to grant various levels of administrative access to different authorized administrators or designated representatives. Each role may be associated with a defined scope of actions available through the Governance Dashboard 206, and the Consent and Governance Engine 202 may enforce those role-based restrictions during evaluation of governance rule update and revocation instructions received from the Governance Dashboard 206.

Figure 3:
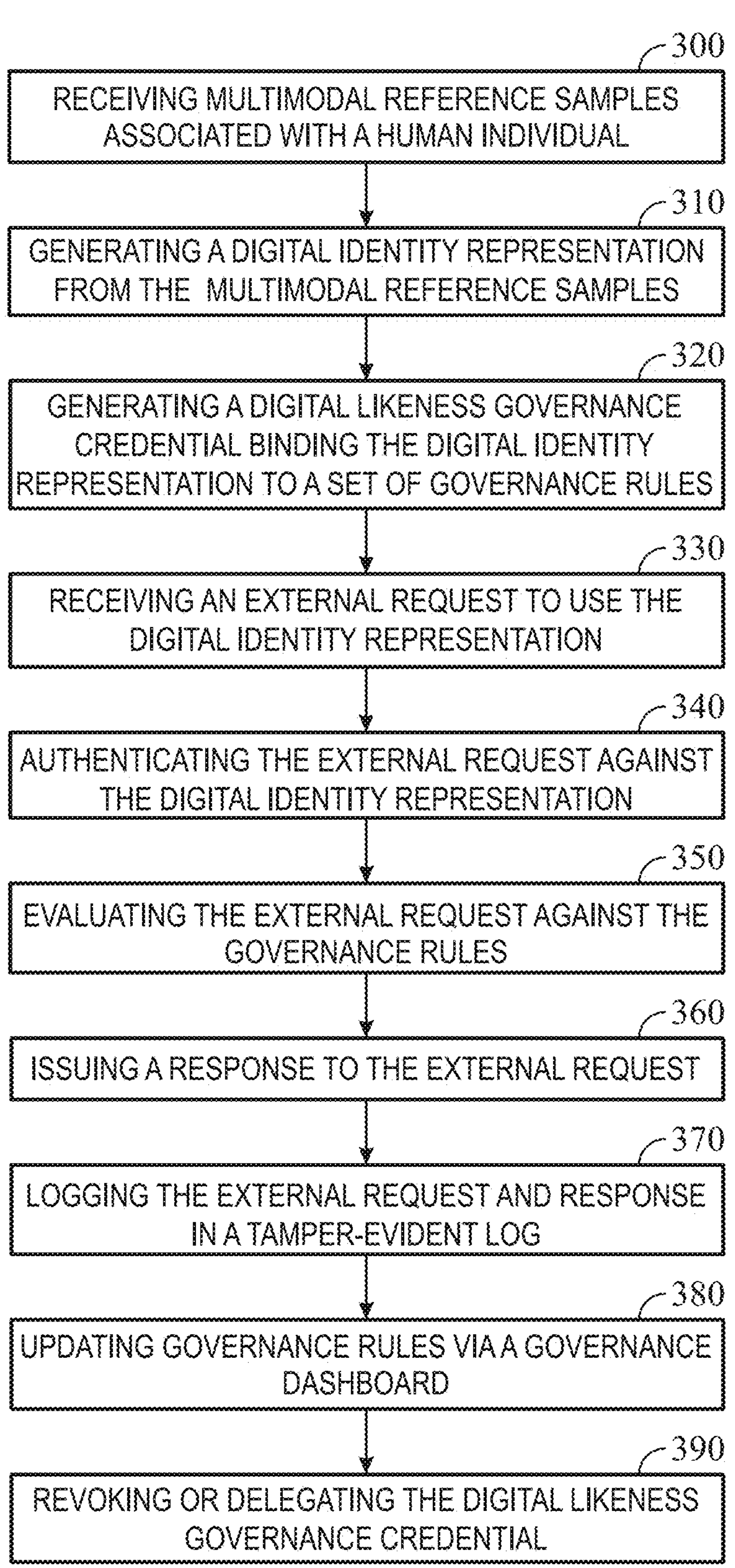
FIG. 3 illustrates a flowchart of a method for governing the use of digital identity, including generation of an identity-bound governance assertion and validation of a Decision Proof Object prior to execution of synthesis or agentic tasks, according to some embodiments.

FIG. 3 illustrates a flowchart of a method for governing the use of digital identity according to some embodiments. The method may be executed by the application program 200 of FIG. 2 running on the computing system 100 of FIG. 1. The steps of the method may be performed by the Identity Issuance Module 208, the Digital Likeness Reference Module 210, the Similarity and Validation Module 212, the Consent and Governance Engine 202, the Enforcement Interface 204, and the Governance Dashboard 206 of FIG. 2, operating in coordination through internal application programming interfaces and shared data structures stored in the data storage 150 of FIG. 1.

At Step 300, the method comprises receiving multimodal reference samples associated with a human individual. The multimodal reference samples may be received by the Identity Issuance Module 208 of FIG. 2 through one or more input channels accessible via the network interface 165 of FIG. 1, including a web-based upload interface, a mobile application, or a direct data transfer from a connected storage device. The multimodal reference samples may comprise one or more of visual data, audio data, behavioral data, and linguistic data. Visual data may include photographs, video recordings, or depth-sensor captures of the individual. Audio data may include voice recordings, speech samples, or audio excerpts from recorded conversations.

Behavioral data may include responses to psychometric assessments, interaction pattern logs, or preference scoring data. Linguistic data may include written documents, electronic messages, social media archives, or transcribed speech. The Identity Issuance Module 208 of FIG. 2 may validate the received multimodal reference samples for file integrity, data type compliance, and metadata completeness prior to proceeding to Step 310.

In some embodiments, the multimodal reference samples received at Step 300 may be supplemented by live capture data, such as real-time audio or video input provided through the I/O devices 130 of FIG. 1. In such embodiments, the Identity Issuance Module 208 of FIG. 2 may process live capture data alongside batch-uploaded samples to produce a more comprehensive set of feature representations.

At Step 310, the method comprises generating a digital identity representation from the multimodal reference samples. The Identity Issuance Module 208 of FIG. 2 processes the multimodal reference samples received at Step 300 through a feature extraction pipeline, applying one or more machine learning models to encode each category of multimodal reference sample into a corresponding set of feature representations. The feature representations generated from visual data may encode facial geometry, skin tone, and other physical characteristics of the individual. The feature representations generated from audio data may encode vocal pitch, cadence, intonation, and other prosodic characteristics of the individual. The feature representations generated from behavioral and linguistic data may encode semantic style, emotional tone, decision-making patterns, and conversational tendencies of the individual. The Identity Issuance Module 208 of FIG. 2 aggregates the feature representations generated from each modality into a unified digital identity representation and stores the digital identity representation in the Digital Likeness Reference Module 210 of FIG. 2 for ongoing management.

In some embodiments, the feature extraction pipeline applied at Step 310 may include a transformer-based neural network model for processing linguistic and behavioral data and a convolutional neural network model for processing visual data. The outputs of these models may be concatenated or combined through a learned fusion layer to produce a single unified feature vector representing the digital identity of the individual across all modalities.

At Step 320, the method comprises generating an identity-bound governance assertion binding the digital identity representation to a set of governance rules. The Identity Issuance Module 208 of FIG. 2 generates the identity-bound governance assertion by associating the digital identity representation stored in the Digital Likeness Reference Module 210 of FIG. 2 with the governance rules provided by the individual or an authorized administrator. The governance rules specify authorized uses, restricted uses, and conditional uses of the digital identity representation. The Identity Issuance Module 208 of FIG. 2 stores the identity-bound governance assertion in the data storage 150 of FIG. 1 and transmits the governance rules to the Consent and Governance Engine 202 of FIG. 2 for enforcement. The identity-bound governance assertion may be issued in a portable format enabling the identity-bound governance assertion to be validated across a plurality of platforms without requiring each platform to maintain a separate copy of the governance rules.

In some embodiments, the identity-bound governance assertion generated at Step 320 may be encoded as a cryptographically signed token, such as a JSON Web Token or a verifiable credential conforming to a decentralized identity standard, enabling third-party platforms to verify the authenticity and integrity of the identity-bound governance assertion without communicating directly with the application program 200 of FIG. 2.

At Step 330, the method comprises receiving an external request to use the digital identity representation. The Enforcement Interface 204 of FIG. 2 receives the external request through a network-facing application programming interface endpoint accessible to third-party platforms and services via the network interface 165 of FIG. 1. The external request may specify the identity of the requesting party, the intended use of the digital identity representation, the target platform or environment in which the digital identity representation would be deployed, and any additional parameters relevant to the governance rule evaluation to be performed at Step 350. The Enforcement Interface 204 of FIG. 2 parses the external request and extracts the relevant attributes for use in the authentication step that follows.

At Step 340, the method comprises authenticating the external request against the digital identity representation. The Enforcement Interface 204 of FIG. 2 extracts identity-related data from the external request and submits that data to the Similarity and Validation Module 212 of FIG. 2, which compares the extracted data against the stored feature representations maintained by the Digital Likeness Reference Module 210 of FIG. 2. The Similarity and Validation Module 212 of FIG. 2 applies a similarity scoring algorithm to compute a similarity score between the identity-related data included in the external request and the stored feature representations of the digital identity representation. The resulting similarity score is returned to the Enforcement Interface 204 of FIG. 2 for use in the evaluation performed at Step 350. Authentication at Step 340 allows the Enforcement Interface 204 of FIG. 2 to confirm whether the external request pertains to the digital identity representation of the individual before proceeding to governance rule evaluation.

At Step 350, the method comprises evaluating the external request against the governance rules. The Enforcement Interface 204 of FIG. 2 submits the attributes of the external request and the similarity score computed at Step 340 to the Consent and Governance Engine 202 of FIG. 2. The Consent and Governance Engine 202 of FIG. 2 executes a rule evaluation algorithm that compares the attributes of the external request against each condition specified in the stored governance rules. The rule evaluation algorithm parses the governance rules in their stored structured schema format and applies logical operators to evaluate compound conditions where applicable. The Consent and Governance Engine 202 of FIG. 2 returns an evaluation result to the Enforcement Interface 204 of FIG. 2 specifying whether the external request is authorized, restricted, or subject to conditional approval.

In some embodiments, a machine learning classification model may assist in prioritizing or pre-filtering common request types; however, final authorization determinations remain subject to the deterministic rule evaluation algorithm described herein.

At Step 360, the method comprises issuing a response to the external request. The Enforcement Interface 204 of FIG. 2 issues a response to the requesting party based on the evaluation result returned by the Consent and Governance Engine 202 of FIG. 2 at Step 350. The response comprises one of an approval, a denial, or a flag. An approval response authorizes the requesting party to proceed with the intended use of the digital identity representation under the conditions specified in the applicable governance rules. A denial response instructs the requesting party that the intended use is not authorized under the applicable governance rules. A flag response indicates that the external request requires further review by the individual or an authorized administrator before a final determination can be made, and the Enforcement Interface 204 of FIG. 2 may transmit a notification to the Governance Dashboard 206 of FIG. 2 upon issuing a flag response. The response is transmitted to the requesting party through the network-facing application programming interface endpoint of the Enforcement Interface 204 of FIG. 2.

At Step 370, the method comprises logging the external request and response in a tamper-evident log. The Enforcement Interface 204 of FIG. 2 records each external request received and each response issued in a tamper-evident log stored in the data storage 150 of FIG. 1. Each log entry records the timestamp of the external request, the identity of the requesting party, the similarity score computed at Step 340, the evaluation result returned at Step 350, and the response issued at Step 360. The tamper-evident log may be implemented using append-only data structures or cryptographic chaining techniques, such as hash-linked log entries, that prevent modification of previously recorded entries. The tamper-evident log may be accessible to the individual or authorized administrator through the Governance Dashboard 206 of FIG. 2.

In some embodiments, the tamper-evident log maintained at Step 370 may be stored on a distributed ledger, providing a decentralized and independently verifiable record of all external requests and responses associated with the identity-bound governance assertion. In such embodiments, each log entry may be recorded as a transaction on the distributed ledger, enabling any authorized party to verify the completeness and integrity of the log without relying on the application program 200 of FIG. 2 as a trusted intermediary.

At Step 380, the method comprises updating governance rules via the Governance Dashboard 206. The Governance Dashboard 206 of FIG. 2 provides a user interface through which the individual or an authorized administrator may modify the governance rules stored in the Consent and Governance Engine 202 of FIG. 2. In response to a governance rule update submitted through the Governance Dashboard 206 of FIG. 2, the Governance Dashboard 206 of FIG. 2 transmits an update instruction to the Consent and Governance Engine 202 of FIG. 2, which updates the stored governance rules accordingly. The Consent and Governance Engine 202 of FIG. 2 applies the updated governance rules to all subsequent external requests received by the Enforcement Interface 204 of FIG. 2. The update instruction and the resulting changes to the governance rules may be recorded in the tamper-evident log maintained by the Enforcement Interface 204 of FIG. 2.

At Step 390, the method comprises revoking or delegating the identity-bound governance assertion. Revocation may be initiated by the individual or an authorized administrator through the Governance Dashboard 206 of FIG. 2. In response to a revocation instruction transmitted through the Governance Dashboard 206 of FIG. 2, the Consent and Governance Engine 202 of FIG. 2 invalidates the identity-bound governance assertion, causing the Enforcement Interface 204 of FIG. 2 to deny all subsequent external requests until a new identity-bound governance assertion is issued by the Identity Issuance Module 208 of FIG. 2. Delegation may also be initiated through the Governance Dashboard 206 of FIG. 2, enabling the individual to authorize a designated representative to act on behalf of the individual within a defined subset of the governance rules. The Consent and Governance Engine 202 of FIG. 2 stores a delegation record associating the designated representative with the subset of governance rules and applies the delegation record during evaluation of subsequent external requests at Step 350. Both revocation and delegation events may be recorded in the tamper-evident log maintained by the Enforcement Interface 204 of FIG. 2.

In some embodiments, delegation at Step 390 may be time-limited, with the Consent and Governance Engine 202 of FIG. 2 automatically expiring the delegation record upon the occurrence of a specified date or event and restoring full governance authority to the individual without requiring a separate revocation instruction.

Figure 4:
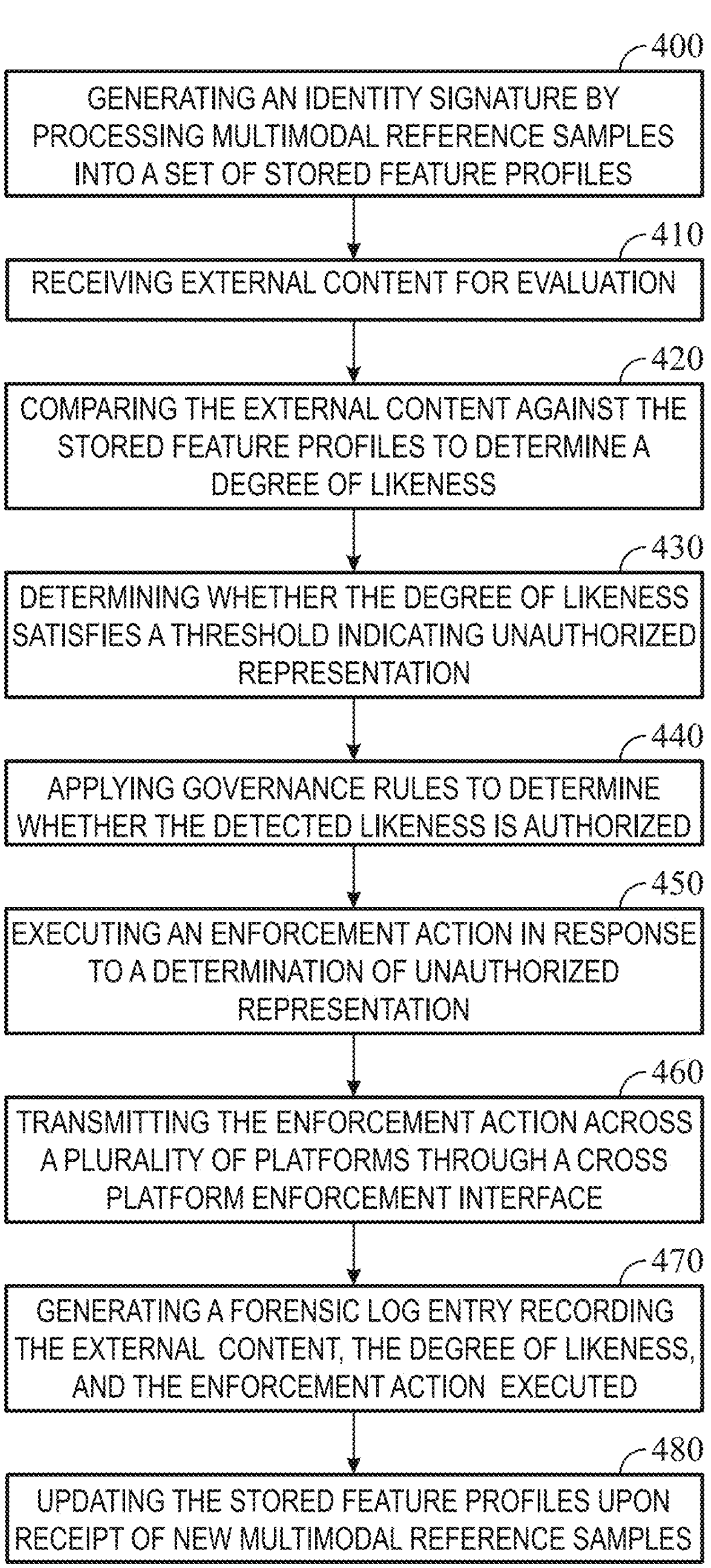
FIG. 4 illustrates a flowchart of a method for detecting and preventing unauthorized representation of a protected individual through similarity scoring and governance rule evaluation, according to some embodiments.

FIG. 4 illustrates a flowchart of a method for detecting and preventing unauthorized representation of a protected individual according to some embodiments. The method may be executed by the application program 200 of FIG. 2 running on the computing system 100 of FIG. 1. The steps of the method may be performed by the Identity Issuance Module 208, the Digital Likeness Reference Module 210, the Similarity and Validation Module 212, the Consent and Governance Engine 202, and the Enforcement Interface 204 of FIG. 2, operating in coordination through internal application programming interfaces and shared data structures stored in the data storage 150 of FIG. 1.

At Step 400, the method comprises generating an identity signature for the protected individual by processing multimodal reference samples associated with the protected individual into a set of stored feature profiles. The Identity Issuance Module 208 of FIG. 2 receives the multimodal reference samples through one or more input channels accessible via the network interface 165 of FIG. 1 and processes the multimodal reference samples through a feature extraction pipeline, applying one or more machine learning models to encode each category of multimodal reference sample into a corresponding feature profile. The feature profiles generated from visual data may encode facial geometry, skin tone, and physical characteristics unique to the protected individual. The feature profiles generated from audio data may encode vocal pitch, cadence, intonation, and other prosodic characteristics of the protected individual. The feature profiles generated from behavioral and linguistic data may encode semantic style, emotional tone, and conversational tendencies of the protected individual. The Identity Issuance Module 208 of FIG. 2 aggregates the feature profiles generated from each modality into the identity signature and stores the identity signature as a set of stored feature profiles in the Digital Likeness Reference Module 210 of FIG. 2. The identity signature serves as the reference against which all subsequent external content is evaluated throughout the method. In some embodiments, the identity signature corresponds to or is derived from the digital identity representation stored for the protected individual.

In some embodiments, the identity signature generated at Step 400 may be represented as a unified high-dimensional feature vector produced by a multimodal fusion model that combines the outputs of modality-specific feature extraction models through a learned fusion layer. Such a representation may improve the sensitivity and specificity of the likeness comparison performed at Step 420 by capturing cross-modal relationships between the visual, audio, behavioral, and linguistic characteristics of the protected individual.

In some embodiments, the feature extraction pipeline applied at Step 400 may apply data augmentation techniques to the multimodal reference samples, such as introducing variations in lighting, background noise, or paraphrasing of linguistic content, to generate a more robust identity signature that remains effective across a wider range of conditions under which external content may be encountered at Step 410.

At Step 410, the method comprises receiving external content for evaluation. The Enforcement Interface 204 of FIG. 2 receives the external content through the network-facing application programming interface endpoint accessible via the network interface 165 of FIG. 1. External content may be submitted by third-party platforms, automated content monitoring systems, or individuals seeking to verify whether a piece of content constitutes an authorized or unauthorized representation of the protected individual. The external content may comprise one or more of visual data, audio data, linguistic data, or AI-generated synthetic content replicating one or more characteristics of the protected individual. The Enforcement Interface 204 of FIG. 2 parses the received external content and routes the external content to the Similarity and Validation Module 212 of FIG. 2 for processing at Step 420.

In some embodiments, the Enforcement Interface 204 of FIG. 2 may be configured to receive external content proactively through an automated content monitoring integration that periodically retrieves content from connected external platforms via the network 190 of FIG. 1, rather than waiting for external content to be submitted by a third party. In such embodiments, the Enforcement Interface 204 of FIG. 2 may apply filtering heuristics to identify candidate content for evaluation before submitting the candidate content to the Similarity and Validation Module 212 of FIG. 2, reducing the volume of content processed at Step 420.

At Step 420, the method comprises comparing the external content against the stored feature profiles to determine a similarity score between the external content and the identity signature. The Similarity and Validation Module 212 of FIG. 2 first extracts feature representations from the external content using the same feature extraction models applied by the Identity Issuance Module 208 of FIG. 2 at Step 400, ensuring that the comparison is performed in a consistent feature space. The Similarity and Validation Module 212 of FIG. 2 then applies a similarity scoring algorithm to compute a similarity score between the feature representations extracted from the external content and the stored feature profiles maintained by the Digital Likeness Reference Module 210 of FIG. 2. The similarity scoring algorithm may compute cosine similarity over high-dimensional feature embeddings, producing a numerical similarity score between zero and one, where a score approaching one indicates a high similarity score between the external content and the identity signature of the protected individual. The Similarity and Validation Module 212 of FIG. 2 returns the similarity score to the Enforcement Interface 204 of FIG. 2 for use in the determination performed at Step 430.

In some embodiments, the Similarity and Validation Module 212 of FIG. 2 may perform modality-specific comparisons at Step 420, computing separate similarity scores for each data modality present in the external content and aggregating those scores through a weighted combination to produce a composite similarity score. The weights applied to each modality may be configurable by the protected individual or an authorized administrator through the Governance Dashboard 206 of FIG. 2.

In some embodiments, the deterministic embedding contract described above is applied during feature extraction and comparison to ensure version compatibility prior to similarity scoring. If embeddings originate from incompatible model identifiers, preprocessing configurations, or deterministic embedding contract identifiers, the system returns a VERSION_MISMATCH state. Where a VERSION_MISMATCH state is returned, downstream governance evaluation, Decision Proof Object generation, and execution authorization are terminated until compatibility is restored. In VERSION_MISMATCH states, the similarity score may be null or treated as invalid, and governance evaluation does not proceed until embeddings are regenerated under a compatible deterministic embedding contract.

At Step 430, the method comprises determining whether the similarity score satisfies a threshold indicating unauthorized representation. The Enforcement Interface 204 of FIG. 2 compares the similarity score returned by the Similarity and Validation Module 212 of FIG. 2 at Step 420 against a threshold value stored in association with the identity signature or stored feature profiles in the data storage 150 of FIG. 1. If the similarity score satisfies the threshold, the Enforcement Interface 204 of FIG. 2 determines that the external content presents a similarity score to the identity signature sufficient to indicate a potential unauthorized representation of the protected individual and proceeds to Step 440. If the similarity score does not satisfy the threshold, the Enforcement Interface 204 of FIG. 2 may record the evaluation result in the forensic log and take no further enforcement action. The threshold value may be configurable by the protected individual or an authorized administrator through the Governance Dashboard 206 of FIG. 2, enabling the protected individual to adjust the sensitivity of the detection system to reflect the protected individual's risk tolerance and the specific characteristics of the protected individual's identity.

At Step 440, the method comprises applying governance rules to determine whether the detected likeness is authorized. In some embodiments, the similarity threshold functions as a trigger for governance rule evaluation, and the governance rules determine whether the detected likeness is authorized. Upon determining at Step 430 that the similarity score satisfies the threshold, the Enforcement Interface 204 of FIG. 2 submits the external content attributes and the similarity score to the Consent and Governance Engine 202 of FIG. 2. The Consent and Governance Engine 202 of FIG. 2 evaluates the detected likeness against the governance rules stored in association with the identity signature, applying the rule evaluation algorithm to determine whether the external content falls within an authorized use, a restricted use, or a conditional use as defined by the governance rules. A governance rule may specify, for example, that a detected likeness in content published by a specific platform or requesting party is authorized, or that a detected likeness in AI-generated synthetic content is restricted regardless of the similarity score. If the Consent and Governance Engine 202 of FIG. 2 determines that the detected likeness satisfies one or more conditions under which the likeness is authorized, the Consent and Governance Engine 202 of FIG. 2 returns an authorized evaluation result to the Enforcement Interface 204 of FIG. 2, which suppresses the enforcement action that would otherwise be executed at Step 450. If the Consent and Governance Engine 202 of FIG. 2 determines that the detected likeness is not authorized, the Consent and Governance Engine 202 of FIG. 2 returns an unauthorized evaluation result to the Enforcement Interface 204 of FIG. 2, which proceeds to Step 450.

At Step 450, the method comprises executing an enforcement action in response to a determination of unauthorized representation. The Enforcement Interface 204 of FIG. 2 executes one or more enforcement actions selected based on the attributes of the external content and the evaluation result returned by the Consent and Governance Engine 202 of FIG. 2 at Step 440. Available enforcement actions include blocking the external content, tagging the external content with a marker identifying the external content as an unauthorized representation of the protected individual, and generating an alert for transmission to the protected individual or an authorized administrator through the Governance Dashboard 206 of FIG. 2. The Enforcement Interface 204 of FIG. 2 may apply enforcement actions to AI-generated content determined to replicate the identity signature without authorization in the same manner as other unauthorized external content, using the similarity score computed at Step 420 and the governance rule evaluation performed at Step 440 to support the enforcement determination. The enforcement action selected by the Enforcement Interface 204 of FIG. 2 may be configurable by the protected individual through the Governance Dashboard 206 of FIG. 2, enabling the protected individual to specify preferred enforcement responses for various categories of unauthorized representation.

In some embodiments, the Enforcement Interface 204 of FIG. 2 may apply a graduated enforcement response at Step 450, selecting a less restrictive enforcement action such as tagging or alerting for external content with a similarity score near the threshold and a more restrictive enforcement action such as blocking for external content with a similarity score substantially exceeding the threshold.

At Step 460, the method comprises transmitting the enforcement action across a plurality of platforms through a cross-platform enforcement interface. In some embodiments, the external platforms are under control of a system operator or are integrated platforms configured to accept and enforce the transmitted enforcement instructions. The Enforcement Interface 204 of FIG. 2 transmits the enforcement action determined at Step 450 to each of a plurality of external platforms through a cross-platform enforcement interface. The cross-platform enforcement interface communicates with external platforms through standardized application programming interface calls, transmitting enforcement instructions in a format compatible with each external platform's content moderation or access control systems. The cross-platform enforcement interface may maintain a registry of connected external platforms and their corresponding application programming interface specifications, enabling the Enforcement Interface 204 of FIG. 2 to coordinate enforcement across multiple digital environments in response to a single enforcement determination without requiring separate manual enforcement actions on each platform.

In some embodiments, the cross-platform enforcement interface may support asynchronous enforcement transmission, queuing enforcement instructions for platforms that are temporarily unavailable and retransmitting the enforcement instructions upon restoration of connectivity via the network 190 of FIG. 1. In such embodiments, the Enforcement Interface 204 of FIG. 2 may maintain a transmission status record for each platform and generate an alert through the Governance Dashboard 206 of FIG. 2 if enforcement transmission to a platform fails after a configurable number of retry attempts.

At Step 470, the method comprises generating a forensic log entry recording the external content, the similarity score, and the enforcement action executed. The Enforcement Interface 204 of FIG. 2 generates a forensic log entry in the tamper-evident log stored in the data storage 150 of FIG. 1 upon completion of the enforcement action at Step 450 and the cross-platform transmission at Step 460. Each forensic log entry records the external content or a reference to the external content, the similarity score computed at Step 420, the governance rule evaluation result returned at Step 440, the enforcement action executed at Step 450, the platforms to which the enforcement action was transmitted at Step 460, and the timestamp of each event. The forensic log entry is stored using append-only data structures or cryptographic chaining techniques that prevent modification of previously recorded entries, preserving the integrity of the forensic record for use in dispute resolution, regulatory compliance, or legal proceedings. The forensic log may be accessible to the protected individual or an authorized administrator through the Governance Dashboard 206 of FIG. 2.

At Step 480, the method comprises updating the stored feature profiles upon receipt of new multimodal reference samples associated with the protected individual. The Digital Likeness Reference Module 210 of FIG. 2 receives updated multimodal reference samples and routes the updated multimodal reference samples to the Identity Issuance Module 208 of FIG. 2, which reprocesses the updated multimodal reference samples through the feature extraction pipeline applied at Step 400. The Identity Issuance Module 208 of FIG. 2 merges the resulting updated feature profiles into the existing stored feature profiles maintained by the Digital Likeness Reference Module 210 of FIG. 2, updating the identity signature of the protected individual to reflect changes in the protected individual's appearance, voice, or behavioral characteristics over time. The updated stored feature profiles are made available to the Similarity and Validation Module 212 of FIG. 2 for use in subsequent comparisons performed at Step 420, ensuring that the detection system remains accurate as the protected individual's characteristics evolve.

In some embodiments, the Digital Likeness Reference Module 210 of FIG. 2 may maintain prior versions of the stored feature profiles alongside the updated stored feature profiles, enabling the Similarity and Validation Module 212 of FIG. 2 to compare external content against multiple versions of the identity signature where the date of creation of the external content is known and relevant to the evaluation.

Figure 5:
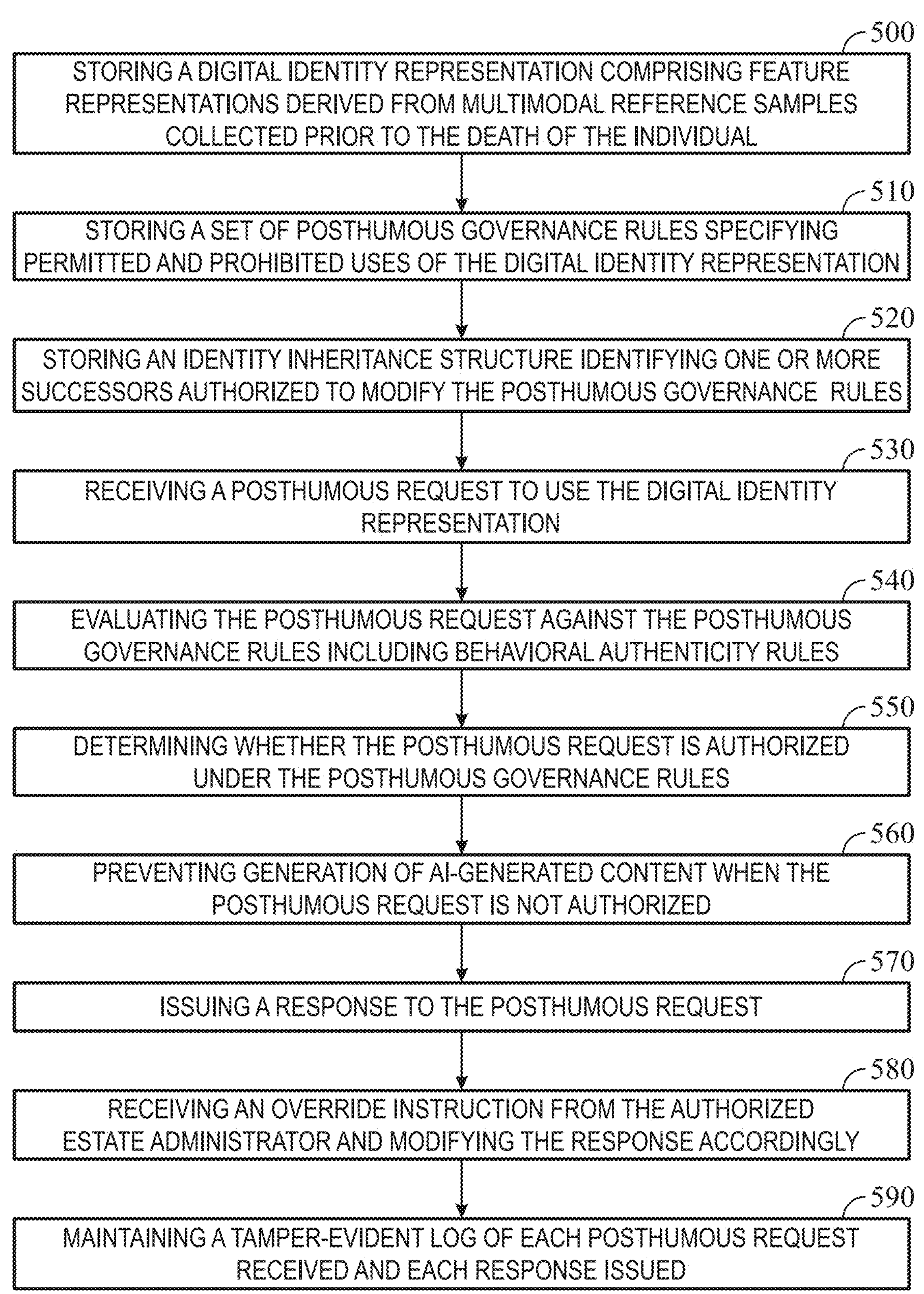
FIG. 5 illustrates a flowchart of a method for governing a digital identity after death of the associated individual, including posthumous governance rules and identity inheritance structures, according to some embodiments.

FIG. 5 illustrates a flowchart of a method for governing a digital identity of an individual after the death of the individual according to some embodiments. The method may be executed by the application program 200 of FIG. 2 running on the computing system 100 of FIG. 1. The steps of the method may be performed by the Identity Issuance Module 208, the Digital Likeness Reference Module 210, the Similarity and Validation Module 212, the Consent and Governance Engine 202, the Enforcement Interface 204, and the Governance Dashboard 206 of FIG. 2, operating in coordination through internal application programming interfaces and shared data structures stored in the data storage 150 of FIG. 1.

At Step 500, the method comprises storing a digital identity representation comprising feature representations derived from multimodal reference samples collected prior to the death of the individual. The Identity Issuance Module 208 of FIG. 2 processes the multimodal reference samples through a feature extraction pipeline, applying one or more machine learning models to encode each category of multimodal reference sample into a corresponding set of feature representations characterizing the individual. The multimodal reference samples may comprise one or more of visual data, audio data, behavioral data, and linguistic data collected during the lifetime of the individual. Visual data may include photographs, video recordings, or depth-sensor captures of the individual. Audio data may include voice recordings or speech samples. Behavioral data may include interaction pattern logs, psychometric assessment responses, or preference scoring data. Linguistic data may include written documents, electronic messages, or transcribed speech. The Identity Issuance Module 208 of FIG. 2 aggregates the feature representations generated from each modality into the digital identity representation and stores the digital identity representation in the Digital Likeness Reference Module 210 of FIG. 2. The digital identity representation stored at Step 500 serves as the authoritative reference for all posthumous governance evaluations performed throughout the method and is treated as sealed following the death of the individual except as permitted by the posthumous governance rules stored at Step 510 and the identity inheritance structure stored at Step 520.

In some embodiments, the digital identity representation stored at Step 500 may be cryptographically sealed upon the death of the individual, with the Identity Issuance Module 208 of FIG. 2 generating a cryptographic hash of the stored feature representations and recording the cryptographic hash in the tamper-evident log maintained by the Enforcement Interface 204 of FIG. 2. The cryptographic hash may be used in subsequent integrity verification operations to confirm that the digital identity representation has not been altered following the death of the individual.

At Step 510, the method comprises storing a set of posthumous governance rules specifying permitted and prohibited uses of the digital identity representation following the death of the individual. The posthumous governance rules may be established by the individual prior to death or by an authorized estate administrator following the death of the individual, and are stored in the Consent and Governance Engine 202 of FIG. 2 in a structured schema, such as a JSON-based rule set, specifying conditions and corresponding outcomes in a machine-readable format. Permitted uses may include uses expressly authorized by the individual or the authorized estate administrator, such as display of the digital identity representation in a memorial context or use by a specified family member. Prohibited uses may include uses expressly forbidden by the individual or the authorized estate administrator, such as commercial exploitation of the digital identity representation or deployment of AI-generated content replicating the digital identity representation without authorization. The posthumous governance rules may also include behavioral authenticity rules restricting outputs derived from the digital identity representation to behaviors consistent with the digital identity representation of the individual as established from the multimodal reference samples collected prior to the death of the individual. Behavioral authenticity rules may specify, for example, that any AI-generated output derived from the digital identity representation must remain within the range of behavioral characteristics captured in the stored feature representations and may not attribute statements, positions, or behaviors to the individual that are inconsistent with the digital identity representation. In some embodiments, behavioral authenticity is evaluated using one or more classifiers, embedding-distance thresholds, or rule-based constraints applied to generated outputs relative to the stored feature representations.

In some embodiments, the posthumous governance rules stored at Step 510 may include time-limited permissions that automatically expire upon the occurrence of a specified date or event, after which the Consent and Governance Engine 202 of FIG. 2 treats the corresponding use as prohibited without requiring a separate update instruction from the authorized estate administrator.

In some embodiments, the posthumous governance rules stored at Step 510 may be encoded as smart contract logic deployed on a distributed ledger through a blockchain-based smart contract layer implemented by the Consent and Governance Engine 202 of FIG. 2. In such embodiments, the posthumous governance rules may be evaluated and enforced through cryptographically secured smart contract execution, providing a decentralized and independently verifiable record of all governance rule evaluations performed following the death of the individual.

At Step 520, the method comprises storing an identity inheritance structure identifying one or more successors authorized to modify the posthumous governance rules following the death of the individual. The identity inheritance structure may be established by the individual prior to death and is stored in the Consent and Governance Engine 202 of FIG. 2 in association with the posthumous governance rules stored at Step 510. The identity inheritance structure identifies each successor by a verifiable credential or other authentication identifier and specifies the scope of modifications each successor is authorized to make to the posthumous governance rules. The Consent and Governance Engine 202 of FIG. 2 enforces the identity inheritance structure by verifying the identity and authorization scope of any party submitting a modification to the posthumous governance rules through the Governance Dashboard 206 of FIG. 2 and rejecting modifications submitted by parties not identified in the identity inheritance structure or exceeding the modification scope assigned to the submitting party.

In some embodiments, the identity inheritance structure stored at Step 520 may specify a hierarchical succession order, designating a primary successor and one or more alternate successors to assume governance authority if the primary successor is unable or unwilling to act. The Consent and Governance Engine 202 of FIG. 2 may apply the hierarchical succession order when evaluating modification instructions received through the Governance Dashboard 206 of FIG. 2 to determine which successor's instructions take precedence in the event of conflicting modifications.

At Step 530, the method comprises receiving a posthumous request to use the digital identity representation. The Enforcement Interface 204 of FIG. 2 receives the posthumous request through the network-facing application programming interface endpoint accessible via the network interface 165 of FIG. 1. The posthumous request may be submitted by a third-party platform, a family member, an estate administrator, a researcher, a commercial entity, or any other party seeking to use the digital identity representation of the individual following the death of the individual. The posthumous request may specify the identity of the requesting party, the intended use of the digital identity representation, the target platform or environment in which the digital identity representation would be deployed, and any additional parameters relevant to the posthumous governance rule evaluation to be performed at Step 540. The Enforcement Interface 204 of FIG. 2 parses the posthumous request and extracts the relevant attributes for submission to the Consent and Governance Engine 202 of FIG. 2.

At Step 540, the method comprises evaluating the posthumous request against the posthumous governance rules including behavioral authenticity rules. The Enforcement Interface 204 of FIG. 2 submits the attributes of the posthumous request to the Consent and Governance Engine 202 of FIG. 2, which executes the rule evaluation algorithm against the posthumous governance rules stored at Step 510.

The rule evaluation algorithm parses the posthumous governance rules in their stored structured schema format and applies logical operators to evaluate compound conditions where applicable. Where the posthumous request involves the generation of AI-generated content derived from the digital identity representation, the Consent and Governance Engine 202 of FIG. 2 also applies the behavioral authenticity rules stored as part of the posthumous governance rules, evaluating whether the intended output of the posthumous request would remain within the behavioral characteristics captured in the stored feature representations maintained by the Digital Likeness Reference Module 210 of FIG. 2. The Consent and Governance Engine 202 of FIG. 2 returns an evaluation result to the Enforcement Interface 204 of FIG. 2 specifying whether the posthumous request is authorized, prohibited, or subject to conditional approval under the posthumous governance rules.

At Step 550, the method comprises determining whether the posthumous request is authorized under the posthumous governance rules. The Enforcement Interface 204 of FIG. 2 receives the evaluation result returned by the Consent and Governance Engine 202 of FIG. 2 at Step 540 and determines whether the posthumous request is authorized. If the posthumous request is authorized, the Enforcement Interface 204 of FIG. 2 proceeds to Step 570 to issue an approval response. If the posthumous request is not authorized, the Enforcement Interface 204 of FIG. 2 proceeds to Step 560 to prevent generation of AI-generated content and issue a denial or flag response at Step 570.

At Step 560, the method comprises preventing generation of AI-generated content when the posthumous request is not authorized under the posthumous governance rules. Upon a determination at Step 550 that the posthumous request is not authorized, the Enforcement Interface 204 of FIG. 2 transmits a blocking instruction to one or more integrated content generation systems or platforms that has received or may receive the posthumous request. The blocking instruction may be transmitted through the cross-platform enforcement interface of the Enforcement Interface 204 of FIG. 2, enabling coordinated prevention of unauthorized AI-generated content across a plurality of platforms. The Enforcement Interface 204 of FIG. 2 may also generate an alert for transmission to the authorized estate administrator through the Governance Dashboard 206 of FIG. 2, notifying the authorized estate administrator of the unauthorized posthumous request and the blocking action taken.

In some embodiments, the Enforcement Interface 204 of FIG. 2 may apply the behavioral authenticity rules stored as part of the posthumous governance rules at Step 560 to evaluate whether AI-generated content proposed in connection with the posthumous request would attribute statements, positions, or behaviors to the individual that are inconsistent with the digital identity representation stored at Step 500, and may block generation of such content even where the posthumous request is otherwise within a permitted use category under the posthumous governance rules.

At Step 570, the method comprises issuing a response to the posthumous request. The Enforcement Interface 204 of FIG. 2 issues a response to the requesting party based on the determination made at Step 550. The response comprises one of an approval, a denial, or a flag. An approval response authorizes the requesting party to proceed with the intended use of the digital identity representation under the conditions specified in the applicable posthumous governance rules. A denial response instructs the requesting party that the intended use is not authorized under the applicable posthumous governance rules. A flag response indicates that the posthumous request requires further review by the authorized estate administrator or a designated successor before a final determination can be made, and the Enforcement Interface 204 of FIG. 2 may transmit a notification to the Governance Dashboard 206 of FIG. 2 upon issuing a flag response. The response is transmitted to the requesting party through the network-facing application programming interface endpoint of the Enforcement Interface 204 of FIG. 2.

At Step 580, the method comprises receiving an override instruction from the authorized estate administrator and modifying the response accordingly. The Governance Dashboard 206 of FIG. 2 provides a user interface through which the authorized estate administrator may submit an override instruction in response to a flag response issued at Step 570 or upon independent review of a prior response issued by the Enforcement Interface 204 of FIG. 2. Upon receipt of an override instruction through the Governance Dashboard 206 of FIG. 2, the Enforcement Interface 204 of FIG. 2 modifies the response issued to the posthumous request in accordance with the override instruction, substituting the original response with the response directed by the authorized estate administrator. The Consent and Governance Engine 202 of FIG. 2 may record the override instruction and the modified response in the tamper-evident log maintained by the Enforcement Interface 204 of FIG. 2 and may update the posthumous governance rules stored at Step 510 to reflect the outcome of the override instruction where the authorized estate administrator directs a permanent change to the governance rules.

In some embodiments, the Governance Dashboard 206 of FIG. 2 may restrict the submission of override instructions to successors identified in the identity inheritance structure stored at Step 520, verifying the identity and authorization scope of the submitting party before transmitting the override instruction to the Enforcement Interface 204 of FIG. 2. Where the submitting party's authorization scope does not permit the requested override, the Governance Dashboard 206 of FIG. 2 may reject the override instruction and generate an alert for transmission to the primary successor identified in the identity inheritance structure.

At Step 590, the method comprises maintaining a tamper-evident log of each posthumous request received and each response issued. The Enforcement Interface 204 of FIG. 2 records each posthumous request received at Step 530 and each response issued at Step 570 in a tamper-evident log stored in the data storage 150 of FIG. 1. Each log entry records the timestamp of the posthumous request, the identity of the requesting party, the evaluation result returned by the Consent and Governance Engine 202 of FIG. 2 at Step 540, the determination made at Step 550, any blocking action taken at Step 560, the response issued at Step 570, and any override instruction received at Step 580. The tamper-evident log may be implemented using append-only data structures or cryptographic chaining techniques that prevent modification of previously recorded entries. The tamper-evident log is accessible to the authorized estate administrator through the Governance Dashboard 206 of FIG. 2, providing a complete and auditable record of all posthumous uses of the digital identity representation for use in estate administration, dispute resolution, and regulatory compliance.

In some embodiments, the tamper-evident log maintained at Step 590 may be stored on a distributed ledger, providing a decentralized and independently verifiable record of all posthumous requests and responses associated with the digital identity representation. In such embodiments, each log entry may be recorded as a transaction on the distributed ledger, enabling any authorized successor identified in the identity inheritance structure stored at Step 520 to verify the completeness and integrity of the log without relying on the application program 200 of FIG. 2 as a trusted intermediary.

Figure 6:
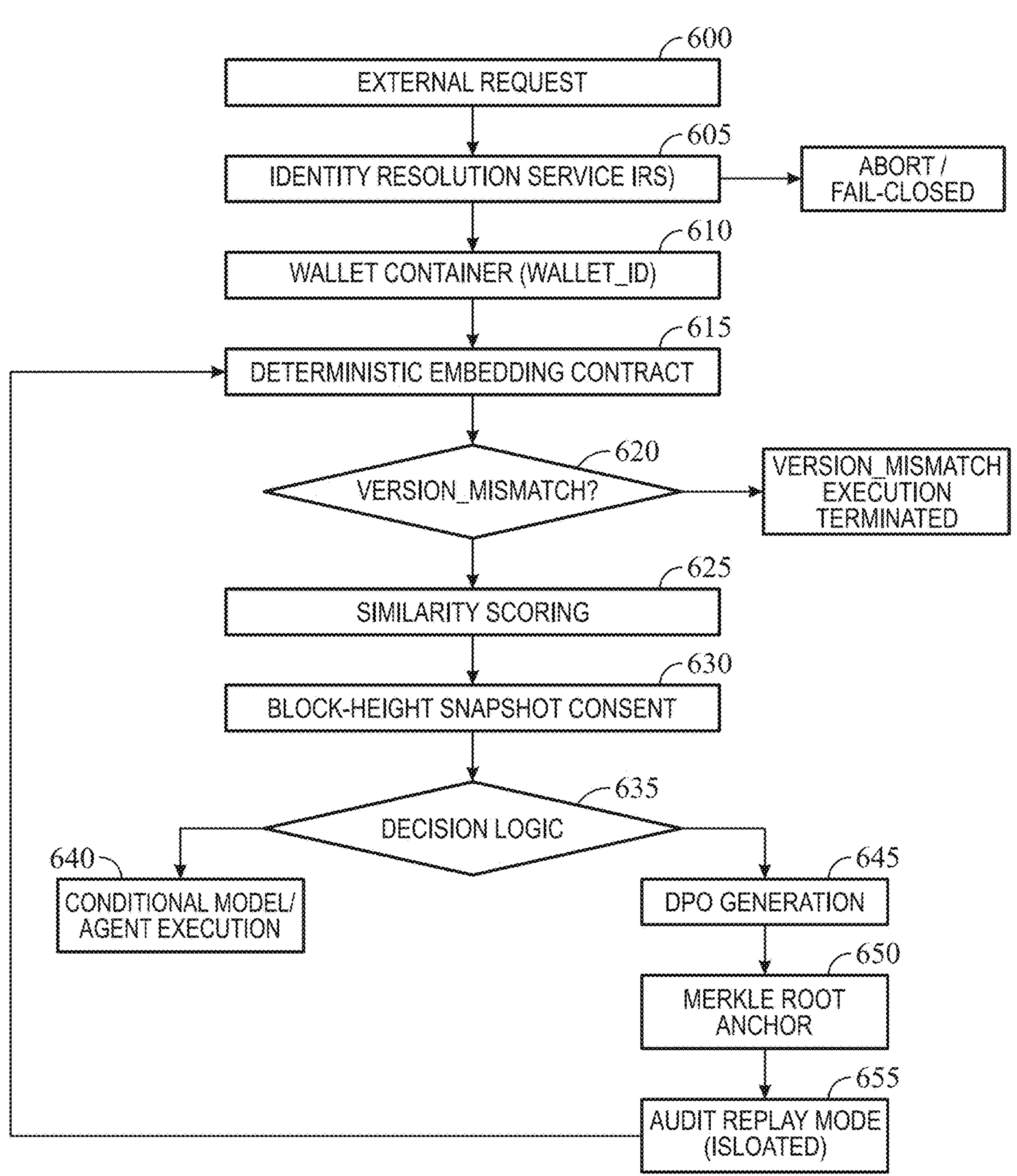
FIG. 6 illustrates a deterministic Gatekeeper decision and replay architecture comprising an Identity Resolution Service (IRS), a wallet identifier abstraction (wallet_id), deterministic embedding contract enforcement with VERSION_MISMATCH logic, pipeline manifest hashing, block-height snapshot consent evaluation, Decision Proof Object (DPO) generation, Merkle root anchoring, and an isolated audit replay mode, according to some embodiments.

FIG. 6 illustrates a deterministic gatekeeper decision and replay architecture. An external request (600) is ingested and routed to an Identity Resolution Service (IRS) (605), which operates under a fail-closed constraint. The IRS outputs canonical identity context including a subject_did and a wallet_id (610). The system evaluates a deterministic embedding contract (615) to verify version compatibility of model and preprocessing configurations. If an incompatibility is detected, a VERSION_MISMATCH state triggers execution termination (620). Upon passing the compatibility check, similarity scoring (625) is performed, and block-height snapshot consent state (630) is evaluated via decision logic (635). The architecture then either permits conditional model or agentic execution (640) or generates a signed Decision Proof Object (DPO) (645). In some embodiments, hashes of DPOs are batched into a Merkle tree and a Merkle root is anchored to a distributed ledger (650), enabling reproducible validation in an isolated audit replay mode (655).

In this disclosure, the various embodiments are described with reference to the flowchart illustrations and/or block diagrams of methods, apparatus (systems), and computer program products.

Those skilled in the art would understand that each block of the flowchart illustrations and/or block diagrams, and combinations of blocks in the flowchart illustrations and/or block diagrams, can be implemented by computer readable program instructions. The computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. The computer readable program instructions can be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can be loaded onto a computer, other programmable data processing apparatus, or other device to cause a series of operational acts to be performed on the computer, other programmable apparatus, or other device to produce a computer implemented process, such that the instructions that execute on the computer, other programmable apparatus, or other device implement the functions or acts specified in the flowchart and/or block diagram block or blocks.

In this disclosure, the block diagrams in the Figures illustrate the architecture, functionality, and operation of implementations of systems, methods, and computer program products according to the various embodiments. Each block in the flowchart or block diagrams can represent a module, segment, or portion of instructions, which comprises one or more executable instructions for implementing the specified logical function(s). In some embodiments, the functions noted in the blocks can occur out of the order noted in the Figures. For example, two blocks shown in succession can, in fact, be executed concurrently or substantially concurrently, or the blocks can sometimes be executed in the reverse order, depending upon the functionality involved. In some embodiments, each block of the block diagrams and/or flowchart illustration, and combinations of blocks in the block diagrams and/or flowchart illustration, can be implemented by a special purpose hardware-based system that performs the specified functions or acts or conduct combinations of special purpose hardware and computer instructions.

In this disclosure, the subject matter has been described in the general context of computer-executable instructions of a computer program product running on a computer or computers, and those skilled in the art would recognize that this disclosure can be implemented in combination with other program modules. Program modules include routines, programs, components, data structures, etc. that perform tasks and/or implement abstract data types. Those skilled in the art would appreciate that the computer-implemented methods disclosed herein can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated embodiments can be practiced in distributed computing environments where tasks are performed by remote processing devices that are linked through a communications network. Some embodiments of this disclosure can be practiced on a stand-alone computer. In a distributed computing environment, program modules can be located in both local and remote memory storage devices.

In this disclosure, the terms "component," "system," "platform," "interface," and the like, can refer to and/or include a computer-related entity or an entity related to an operational machine with one or more specific functionalities. The disclosed entities can be hardware, a combination of hardware and software, software, or software in execution. For example, a component can be a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As another example, a component can be an apparatus that provides specific functionality through electronic components without mechanical parts, wherein the electronic components can include a processor or other means to execute software or firmware that confers at least in part the functionality of the electronic components. In some embodiments, a component can emulate an electronic component via a virtual machine, e.g., within a cloud computing system.

The phrase "application" as is used herein means software other than the operating system, such as Word processors, database managers, Internet browsers, and the like. Each application generally has its own user interface, which allows a user to interact with a particular program. The user interface for most operating systems and applications is a graphical user interface (GUI), which uses graphical screen elements, such as windows (which are used to separate the screen into distinct work areas), icons (which are small images that represent computer resources, such as files), pull-down menus (which give a user a list of options), scroll bars (which allow a user to move up and down a window) and buttons (which can be "pushed" with a click of a mouse). A wide variety of applications is known to those in the art.

The phrases "Application Program Interface" and API as are used herein mean a set of commands, functions, and/or protocols that computer programmers can use when building software for a specific operating system. The API allows programmers to use predefined functions to interact with an operating system, instead of writing them from scratch. Common computer operating systems, including Windows, Unix, and the macOS, usually provide an API for programmers. An API is also used by hardware devices that run software programs. The API makes a programmer's job easier, and it also benefits the end user since it ensures that all programs using the same API will have a similar user interface.

The phrase "central processing unit" as is used herein means a computer hardware component that executes individual commands of a computer software program. It reads program instructions from a main or secondary memory and then executes the instructions one at a time until the program ends. During execution, the program may display information to an output device such as a monitor.

The term "execute" as is used herein in connection with a computer, console, server system, or the like means to run, use, operate or conduct an instruction, code, software, program, and/or the like.

In this disclosure, the descriptions of the various embodiments have been presented for purposes of illustration and are not intended to be exhaustive or limited to the embodiments disclosed. Many modifications and variations will be apparent to those of ordinary skill in the art without departing from the scope and spirit of the embodiments described. The terminology used herein was chosen to best explain the principles of the embodiments, the practical application or technical improvement over technologies found in the marketplace, or to enable others of ordinary skill in the art to understand the embodiments disclosed herein. Thus, the claims appended should be interpreted in view of the disclosure, including equivalents and variations apparent to those skilled in the art.

The embodiments described herein represent multiple operational contexts of the same underlying technological improvement, namely, an execution-gating governance architecture that deterministically evaluates identity-bound authorization conditions prior to permitting downstream generative, inference, or interaction operations. Identity verification, likeness misuse detection, agentic task authorization, and posthumous governance enforcement each operate as technical execution controls implemented by the same governance enforcement engine, including fail-closed identity canonicalization, deterministic embedding contract validation with VERSION_MISMATCH gating, consent state evaluation via a consent registry and, in some embodiments, a block-height snapshot reference, and decision recording using signed Decision Proof Objects. Accordingly, the claimed embodiments share a common inventive concept and are not directed to separate inventions.

What is claimed is:

1. A computer-implemented system configured to implement a deterministic execution governance architecture for controlling digital likeness synthesis, representation, or agentic interactions associated with a subject identity representation, the system comprising:

one or more processors; and memory storing instructions that, when executed by the one or more processors, cause the one or more processors to control and coordinate execution of the following operations:

(a) receiving an external request comprising one or more identity inputs; and (b) resolving the one or more identity inputs into a canonical subject_did and a stable wallet_id using an Identity Resolution Service (IRS), wherein the IRS operates as an exclusive authority for generating canonical identity context under a fail-closed ambiguity constraint by:

(i) evaluating candidate identity mappings associated with the external request;

(ii) determining whether multiple mappings satisfy identity resolution criteria; and (iii) terminating downstream execution upon determining that multiple mappings satisfy the identity resolution criteria;

(c) generating feature representations under a deterministic embedding contract comprising:

a model identifier, a preprocessing configuration identifier, and a configuration hash representing the model parameters and preprocessing configuration used during feature generation;

(d) determining whether generated feature representations are compatible with stored feature representations by verifying that the feature representations were produced using a matching deterministic embedding contract identifier and, upon detecting incompatibility, returning a VERSION_MISMATCH state preventing further execution;

(e) retrieving governance rules from a consent registry representing a cryptographically anchored governance state using a block-height snapshot reference comprising a block number and an associated block hash;

(f) generating a Decision Proof Object (DPO) comprising identity context, a pipeline manifest hash, a consent state reference, a decision outcome, and a cryptographic signature over at least the identity context, the pipeline manifest hash, the consent state reference, and the decision outcome, the Decision Proof Object functioning as a cryptographically verifiable execution authorization artifact; and (g) programmatically preventing invocation of a synthesis module or agentic execution interface within a runtime execution environment unless the cryptographic signature of the Decision Proof Object generated in step (f) is successfully validated, such that the runtime execution environment permits execution only when identity resolution, deterministic embedding compatibility, governance rule evaluation, and Decision Proof Object generation have been completed under the deterministic execution governance architecture.

2. The system of claim 1, wherein the Decision Proof Object is included in a Merkle tree and a Merkle root is anchored to a distributed ledger.

3. The system of claim 1, wherein the system includes an isolated audit replay mode configured to reproduce a prior decision using the pipeline manifest hash included in the Decision Proof Object and the block-height snapshot reference.

4. The system of claim 1, wherein the wallet_id remains stable across decentralized identifier key rotations.

5. The system of claim 1, wherein credential assurance metadata associated with the subject_did is included in the Decision Proof Object.

6. The system of claim 1, wherein the consent registry comprises at least one of:

(a) a distributed ledger registry, (b) a smart contract registry, or (c) a database storing consent policies associated with subject_did identifiers.

7. The system of claim 1, wherein the instructions further cause the system to:

(a) receive multimodal reference samples associated with a human individual;

(b) generate a digital identity representation by processing the multimodal reference samples into a set of feature representations;

(c) generate an identity-bound governance assertion binding the digital identity representation to a set of governance rules;

(d) receive an external request to use the digital identity representation;

(e) evaluate the external request against the governance rules; and (f) issue a response comprising an approval, a denial, or a flag.

8. The system of claim 7, wherein the instructions further cause the system to validate whether the external request corresponds to the digital identity representation by comparing data included in the external request against the digital identity representation prior to evaluating the external request against the governance rules.

9. The system of claim 7, wherein the identity-bound governance assertion is portable and interoperable across a plurality of platforms.

10. The system of claim 7, wherein the instructions further cause the system to revoke the identity-bound governance assertion in response to a revocation instruction received from the individual or an authorized administrator.

11. The system of claim 7, wherein the instructions further cause the system to delegate the identity-bound governance assertion to a designated representative, the delegation comprising a subset of the governance rules authorizing the designated representative to act on behalf of the individual.

12. The system of claim 7, wherein the instructions further cause the system to maintain a tamper-evident log comprising hash-linked log entries of each external request received and each response issued.

13. The system of claim 1 further comprising a governance dashboard interface configured to:

(a) present tamper-evident execution records comprising hash-linked log entries associated with synthesis or agentic interactions generated by the enforcement interface;

(b) enable authorized administrators to modify governance rules including consent permissions, delegation settings, revocation policies, and posthumous governance instructions;

(c) generate rule-update transactions recorded within the consent registry; and (d) enforce role-based access controls restricting modification of governance rules to authenticated governance administrators.

14. The system of claim 1, wherein the instructions further cause the system to:

(a) generate an identity signature for a protected individual by processing multimodal reference samples into a set of stored feature profiles;

(b) receive external content for evaluation;

(c) compare the external content against the stored feature profiles to determine a similarity score; and (d) determine whether the similarity score satisfies a predefined similarity threshold indicating unauthorized representation;

(e) in response to satisfaction of the threshold, execute an enforcement action comprising one or more of blocking the external content, tagging the external content, and generating an alert.

15. The system of claim 14, wherein feature extraction and similarity scoring are executed under a deterministic embedding contract and return a VERSION_MISMATCH state upon model incompatibility prior to executing the enforcement action.

16. The system of claim 14, wherein the instructions further cause the system to generate a forensic log entry recording the external content, the similarity score determined, and the enforcement action executed.

17. The system of claim 14, wherein the instructions further cause the system to enforce the enforcement action across a plurality of platforms by transmitting the enforcement action to each of the plurality of platforms through a cross-platform enforcement interface; and wherein the cross-platform enforcement interface is configured to transmit enforcement instructions together with the Decision Proof Object to each receiving platform under control of the system operator, and wherein each receiving platform is configured to verify the cryptographic signature and pipeline manifest hash contained in the transmitted Decision Proof Object prior to permitting execution of the requested operation.

18. The system of claim 14, wherein the instructions further cause the system to apply the enforcement action to AI-generated content determined to replicate the identity signature without authorization.

19. The system of claim 14, wherein the stored feature profiles are updated in response to receipt of additional multimodal reference samples associated with the protected individual.

20. The system of claim 1, wherein the agentic execution interface comprises at least one of:

(a) an application programming interface (API) enabling automated task execution, (b) an AI agent task execution service, or (c) an automated workflow execution engine.

21. The system of claim 1, wherein the pipeline manifest hash represents a cryptographic hash generated from a manifest describing model identifiers, preprocessing configurations, and processing rules associated with execution of the synthesis module or agentic execution interface.

22. The system of claim 1, wherein the deterministic embedding contract identifier and configuration hash are recorded within the Decision Proof Object or an associated execution log.

23. The system of claim 1, wherein enforcement of the governance rules modifies execution of a machine learning pipeline by preventing initialization or loading of a synthesis module or agentic execution interface within a runtime execution environment when the Decision Proof Object fails cryptographic validation, the runtime execution environment being configured to refuse initialization or loading of the synthesis module or agentic execution interface unless the Decision Proof Object is present, its cryptographic signature is successfully validated, and the pipeline manifest hash matches the declared execution configuration.

24. The system of claim 1, wherein the runtime execution environment is further configured to verify the Decision Proof Object received from an external system prior to loading the synthesis module or agentic execution interface, thereby preventing execution when the Decision Proof Object cannot be independently validated by the receiving platform.

25. The system of claim 1, wherein the instructions further cause the system to:

(a) store a set of posthumous governance rules;

(b) receive a posthumous request;

(c) evaluate the posthumous request against the posthumous governance rules; and (d) issue a response comprising an approval, a denial, or a flag;

wherein the instructions further cause the system to prevent invocation of a synthesis module or agentic execution interface when the posthumous request is not authorized.

26. The system of claim 1, wherein the posthumous governance rules are stored in association with an identity inheritance structure identifying one or more successors authorized to modify the posthumous governance rules.

27. The system of claim 1, wherein the instructions further cause the system to enforce the governance rules prior to execution of the synthesis module or agentic execution interface by requiring validation of the Decision Proof Object before model inference or task execution is initiated, and wherein the Decision Proof Object is serialized using a deterministic canonicalization procedure prior to hashing or signing such that independent systems derive identical cryptographic hashes from identical decision contexts.

28. The system of claim 1, wherein the pipeline manifest hash included in the Decision Proof Object uniquely identifies a model execution pipeline comprising one or more model identifiers, preprocessing configurations, and post-processing rules used to produce synthesized output or agentic actions, and wherein the pipeline manifest hash enables reconstruction of a deterministic execution environment comprising the model identifiers, preprocessing configuration, and execution parameters used to generate the original decision outcome.

29. A computer-implemented method for deterministically governing execution of digital likeness synthesis, representation, or agentic interactions associated with a subject identity representation, the method comprising:

receiving an external request comprising one or more identity inputs;

resolving the one or more identity inputs into a canonical subject_did and a stable wallet_id using an Identity Resolution Service (IRS), wherein the IRS resolves the one or more identity inputs under a fail-closed ambiguity constraint by:

evaluating candidate identity mappings associated with the external request, determining whether multiple mappings satisfy identity resolution criteria, and terminating downstream execution when multiple mappings are detected;

generating feature representations under a deterministic embedding contract comprising a model identifier, a preprocessing configuration identifier, and a configuration hash representing model parameters and preprocessing configuration used during feature generation;

determining whether the feature representations generated under the deterministic embedding contract are compatible with stored feature representations by verifying that the feature representations were produced using a matching deterministic embedding contract identifier and, upon detecting incompatibility, returning a VERSION_MISMATCH state preventing further execution;

retrieving governance rules from a consent registry representing a cryptographically anchored governance state using a block-height snapshot reference comprising a block number and an associated block hash;

generating a Decision Proof Object (DPO) comprising identity context, a pipeline manifest hash, a consent state reference, a decision outcome, and a cryptographic signature over at least the identity context, the pipeline manifest hash, the consent state reference, and the decision outcome; and blocking invocation of a synthesis module or agentic execution interface unless the cryptographic signature of the Decision Proof Object is successfully validated.

30. A non-transitory computer-readable medium storing instructions that, when executed by one or more processors, cause the one or more processors to perform a method for deterministically governing execution of digital likeness synthesis, representation, or agentic interactions associated with a subject identity representation, the method comprising:

receiving an external request comprising one or more identity inputs;

resolving the one or more identity inputs into a canonical subject_did and a stable wallet_id using an Identity Resolution Service (IRS), wherein the IRS resolves the one or more identity inputs under a fail-closed ambiguity constraint by:

evaluating candidate identity mappings associated with the external request, determining whether multiple mappings satisfy identity resolution criteria, and terminating downstream execution when multiple mappings are detected;

generating feature representations under a deterministic embedding contract comprising a model identifier, a preprocessing configuration identifier, and a configuration hash representing model parameters and preprocessing configuration used during feature generation;

determining whether the feature representations generated under the deterministic embedding contract are compatible with stored feature representations by verifying that the feature representations were produced using a matching deterministic embedding contract identifier and, upon detecting incompatibility, returning a VERSION_MISMATCH state preventing further execution;

retrieving governance rules from a consent registry representing a cryptographically anchored governance state using a block-height snapshot reference comprising a block number and an associated block hash;

generating a Decision Proof Object (DPO) comprising identity context, a pipeline manifest hash, a consent state reference, a decision outcome, and a cryptographic signature over at least the identity context, the pipeline manifest hash, the consent state reference, and the decision outcome; and blocking invocation of a synthesis module or agentic execution interface unless the cryptographic signature of the Decision Proof Object is successfully validated.

* * * * *